(12) United States Patent
Fukuyama

(10) Patent No.: US 8,119,960 B2
(45) Date of Patent: Feb. 21, 2012

(54) LIGHT EMITTING TYPE LIGHTING SYSTEM, METHOD OF LIGHT EMITTING TYPE LIGHTING, AND SCANNING OPTICAL MICROSCOPE

(75) Inventor: Hiroya Fukuyama, Machida (JP)

(73) Assignee: Olympus Corporation, Tokyo (JP)

( * ) Notice: Subject to any disclaimer, the term of this patent is extended or adjusted under 35 U.S.C. 154(b) by 327 days.

(21) Appl. No.: 12/310,127

(22) PCT Filed: Aug. 2, 2007

(86) PCT No.: PCT/JP2007/065146
§ 371 (c)(1),
(2), (4) Date: Feb. 10, 2009

(87) PCT Pub. No.: WO2008/020548
PCT Pub. Date: Feb. 21, 2008

(65) Prior Publication Data
US 2010/0002291 A1  Jan. 7, 2010

(30) Foreign Application Priority Data

Aug. 18, 2006  (JP) .................................. 2006-223193

(51) Int. Cl.
*G02B 7/04* (2006.01)
*H05B 33/00* (2006.01)
(52) U.S. Cl. .................................. 250/201.3; 250/484.2
(58) Field of Classification Search ............... 250/201.3, 250/458.1, 459.1, 216, 484.2; 372/21, 22, 372/70, 80
See application file for complete search history.

(56) References Cited

U.S. PATENT DOCUMENTS

2005/0111805 A1* 5/2005 Hertz et al. .................... 385/125
2006/0270081 A1* 11/2006 Chua et al. ...................... 438/29

FOREIGN PATENT DOCUMENTS

JP  11-135259  5/1999
(Continued)

OTHER PUBLICATIONS

International Preliminary Report on Patentability dated Feb. 24, 2009, International Application No. PCT/JP2007/065146 filed Aug. 2, 2007.

(Continued)

*Primary Examiner* — Thanh X Luu
(74) *Attorney, Agent, or Firm* — Kenyon & Kenyon LLP

(57) ABSTRACT

Light emitter excitation light (108) of a wavelength $\lambda_1$ emitted by a light source (101) is collected on a light emitter (107) by a collective lens (102). The light emitter (107) is held on a substrate (104), and emits fluorescent light of a wavelength $\lambda_2$ when the light emitter excitation light (108) of the wavelength $\lambda_1$ is irradiated. A diameter of the light emitter (107) being formed to be smaller than the wavelength $\lambda_2$, this fluorescent light includes evanescent waves, and advances through the substrate (104) as an object illuminating light (109) having the light emitter (107) as a point light source. A negative refraction lens (105) is disposed such that an image of the light emitter (107) is formed on a surface of an object 106, and accordingly, not only a propagating-light component included but also a evanescent-wave component in the object illuminating light (109) is also collected simultaneously, and a minute beam spot of a size almost same as of the light emitter (107) is formed on the surface of the object (106).

14 Claims, 19 Drawing Sheets

FOREIGN PATENT DOCUMENTS

JP    2006-072237    3/2006

OTHER PUBLICATIONS

Veselago et al., "The Electrodynamics of Substances with Simultaneously Negative Values of $\epsilon$ and $\mu$", Soviet Physics Uspekhi 10(4): pp. 509-514, 1968.

Hecht, "Optics", $4^{th}$ ed., pp. 471-474 (Addison-Wesley, Reading, MA), 2002.

Pendry, "Negative Refraction Makes a Perfect Lens", Physical Review Letters 85(18): pp. 3966-3969, 2000.

Smith et al., "Composite Medium with Simultaneously Negative Permeability and Permittivity", Physical Review Letters 84(18): pp. 4184-4187, 2000.

Notomi, "Theory of Light Propagation in Strongly Modulated Photonic Crystals: Refractionlike Behavior in the Vicinity of the Photonic Band Gap", Physical Review B 62(16): pp. 10696-10705, 2000.

Valanju et al., "Wave Refraction in Negative-Index Media: Always Positive and Very Inhomogeneous", Physical Review Letters 88(18): pp. 187401, 2002.

Schurig et al., "Negative Index Lens Aberrations", Physical Review E 70, pp. 065601, 2004.

Smith et al., "Limitations on Subdiffraction Imaging with a Negative Refractive Index Slab", Applied Physics Letters 82(10): pp. 1506-1508, 2003.

Tsujiuchi et al., "Handbook of Advanced Optical Technologies" (with English translation of Fig. 1.5.2), pp. 194, (Asakura Shoten, 2002).

Pendry, "A Chiral Route to Negative Refraction", Science 306, pp. 1353-1355, 2004.

Ramakrishna, "Spherical Perfect Lens: Solution of Maxwell's Equations for Spherical Geometry", Physical Review B 69, pp. 115115, 2004.

Podolskiy et al., "Optimizing the Superlens: Manipulating Geometry to Enhance the Resolution", Applied Physics Letters 87, pp. 231113, 2005.

Japanese Office Action, dated Nov. 22, 2011, issued in corresponding Japanese Patent Application No. 2006-223193.

* cited by examiner

LIGHT EMITTING TYPE LIGHTING SYSTEM, METHOD OF LIGHT EMITTING TYPE LIGHTING, AND SCANNING OPTICAL MICROSCOPE

CROSS-REFERENCE TO RELATED APPLICATION

The present application is based upon and claims the benefit of priority from the prior Japanese Patent Application No. 2006-223193 filed on Aug. 18, 2006; the entire contents of which are incorporated herein by reference.

TECHNICAL FIELD

The present invention relates to a lighting system, a method of lighting which can be used in an optical image detector such as a microscope, a camera, and an endoscope, an optical information writing and reading apparatus such as a pickup for an optical disc, and a lithographic apparatus such as a stepper, and a scanning optical microscope.

BACKGROUND ART

In recent years, a resolution capacity of an image detecting apparatus in which, an image pickup optical system such as a microscope, a camera, and an endoscope is used has improved. Particularly, in a field of microscopes and optical recording, an optical system with almost no aberration has been realized, and a resolution capacity as an image pickup optical system has been restricted mainly by a diffraction limit of visible light. Whereas, as it has been disclosed in the following non-patent literatures, an optical material which takes a negative value of a refractive index (hereinafter, 'negative refraction material') has been realized. A proposal mentioning that an imaging of an ultra-high resolution beyond the diffraction limit (hereinafter, 'perfect imaging') is possible when a negative refraction material is used, has been made.

As it has been disclosed in non-patent literature 3, in a case other than a case in which, the refractive index takes a negative value, when a real part of a permittivity or a magnetic permeability is a negative value, a negative refraction phenomenon is observed for specifically polarized electromagnetic waves. Moreover, as it has been disclosed in non-patent literature 5, in a periodic structure such as a photonic crystal, as a result of a photonic band being reflected in a reciprocal lattice space, in spite of each of the refracting index, the permittivity, and the permeability being a positive material, the negative refraction phenomenon is observed for electromagnetic waves of specific wavelength which are polarized in a specific manner.

In view of the abovementioned circumstances, in this specification, a material which shows a negative refraction response for the specific electromagnetic waves will be called as a 'material exhibiting negative refraction'. It is needless to mention that, an expression 'a material exhibiting negative refraction' is a concept of a wider sense than the negative refraction material.

As a material exhibiting negative refraction, apart from the photonic crystal mentioned above, materials such as metallic films, chiral substances, photonic crystals, meta-materials, left-handed materials, backward wave materials, and negative phase velocity media have been known.

According to non-patent literature 1, a material for which, both the permittivity and the permeability take the negative value, the refractive index also becomes a negative value. Furthermore, it has been shown that, such material satisfies a so-called extension of Snell's law, as it will be described later.

FIG. 16 shows refraction of light in an ordinary optical material (hereinafter called as 'an ordinary optical material') having a positive refractive index. When light is transferred from a medium 1 to a medium 2, the light is refracted at a boundary surface of both the media. At this time, Snell's law shown by the following expression (1) is satisfied.

$$n_1 \sin \theta_i = n_2 \sin \theta_r \quad (1)$$

Here, $\theta_i$ denotes an angle of incidence, $\theta_r$ denotes an angle of refraction, $n_1$ denotes a refractive index of the medium 1, and $n_2$ denotes a refractive index of the medium 2.

Whereas, FIG. 17 shows refraction of light when the refractive index $n_2$ of the medium 2 takes a negative value. As shown in FIG. 17, the light which is incident is refracted in a direction opposite to a direction of refraction shown in FIG. 16 with respect to a normal of the boundary surface. At this time, when the angle of refraction $\theta_r$ is let to be a negative value, the abovementioned Snell's law is satisfied.

FIG. 18 shows an imaging relationship by a convex lens 13 in which, an ordinary optical material is used. Light from an object point 11A on an object plane 11 is collected to an image point 12A on an image plane 12 by the convex lens 13. When the refractive index of the lens is positive, for imaging (collecting), a lens surface is required to have a finite curvature.

Whereas, a flat plate made of a material exhibiting negative refraction (hereinafter, appropriately called as a 'negative refraction lens') can collect light in spite of having an infinite curvature. FIG. 19 shows an imaging relationship by a negative refraction lens 14. Light from an object point 11B on an object plane 11 is collected at an image point 12B on an image plane 12 by the negative refraction lens 14.

In non-patent literature 11, a method for realizing a non-equal magnification imaging by forming a curved surface lens by a material exhibiting negative refraction has been disclosed. However, a condition for the perfect imaging being extremely strict, and since a material having a predetermined refractive index gradient in addition to exhibiting negative refraction is necessary, it is not realistic. Actually, all the negative refraction lenses realized in the world have almost a uniform refractive index spatially, and a surface thereof through which, light (electromagnetic waves) passes is a plane surface. Therefore, a spatially uniform flat plate made of a material exhibiting negative refraction will from here onward be called appropriately as a 'negative refraction lens'.

Here, 'spatially uniform' means that, it is uniform with a scale which is larger than a wavelength of the electromagnetic waves. Consequently, it means that, in a case of realizing the negative refraction by an artificial structural material such as a photonic crystal and a meta-material, an effective refractive index (or an effective permittivity or an effecting permeability) which is attributable to the structure is spatially uniform.

In an imaging optical system such as a microscope, a theoretical upper limit value of resolution is determined by a diffraction limit. As it has been described in textbook of optics (non-patent literature 2 for example), according to Rayleigh criterion, the minimum distance between two resolvable points in about $\lambda/NA$. Here, $\lambda$ is a wavelength used, and NA is a numerical aperture. Moreover, a structure smaller than the diffraction limit cannot carry out image dissection by an optical system.

Moreover, a microscope and an optical pickup which improve resolution by using an objective lens of a liquid immersion, an oil immersion, and a solid immersion have been proposed. These increase an effective NA (numerical aperture). Accordingly, the value of λ/NA corresponding to the diffraction limit is made smaller. Here, it is not possible to make the numerical aperture NA larger than a refractive index of a medium in which, an object plane is disposed. Therefore, an upper limit of the numerical aperture NA is about 1.5 to 2.0.

Light which has been emitted from the object point 11A on the object plane 11 is formed of two light waves namely, propagating light which reaches a far distance, and evanescent waves which are attenuated at a distance of about wavelength from the object point 11A. The propagating light corresponds to a low-frequency component of information on the image plane 11. Whereas, the evanescent waves correspond to a high-frequency component of the information on the image plane 11.

A boundary of the propagating light and the evanescent waves corresponds to a spatial frequency equivalent to 1/λ. Particularly, the evanescent waves have frequency within the object plane larger than 1/λ. Therefore, the evanescent waves have a wave-number component in a direction of propagation of light waves perpendicular to the evanescent waves becoming an imaginary number. Therefore, there is a rapid attenuation with receding from the object plane 11.

All the components of the propagating light on the other hand, do not advance to the optical system. A part of the propagating light is vignetted by an aperture in the optical system. Therefore, only a component smaller than NA/λ of the spatial frequency on the object plane 11 reaches the image plane 12. Eventually, in the information reaching the image point 12A, the high-frequency component from the information held by the object point 11A is missing. Accordingly, this becomes a spreading of a point image by diffraction, and restricts the resolution.

In non-patent literature 3 disclosed in recent years, it has been disclosed that the abovementioned evanescent waves are amplified in the negative refraction material. Therefore, in imaging by the negative refraction lens 14 shown in FIG. 19, the amplitude of the evanescent waves on the image plane 12 is shown to have been recovered to a level same as on the object plane 11. In other words, in the optical system shown in FIG. 19, both the propagating light and the evanescent waves are propagated from the object plane 11 to the image plane 12. Therefore, information of the object point 11B is perfectly reproduced at the imaging point 12B. This means that, when an imaging optical system in which, the negative refraction lens 14 is used, perfect imaging in which, the diffraction limit is not restricted is possible.

The abovementioned perfect imaging is not only a theoretical phenomenon. A negative refraction lens has actually been manufactured, and results of experiments have been reported. For instance, in non-patent literature 4, a meta-material in which, a rod and a metallic coil smaller than the wavelength, are arranged periodically, has been manufactured. Moreover, such meta-material has been reported to function as a negative refraction lens in a microwave range.

Moreover, in non-patent literature 5, a method of manufacturing a negative refraction material by using photonic crystal has been disclosed. In the photonic crystal in which, an air rod is disposed in a hexagonal lattice form in a dielectric substance, there exists a photonic band in which, the effective refractive index is isotropic as well as negative. Furthermore, the photonic crystal can be deemed as a two-dimensional uniform negative refraction material with respect to electromagnetic waves of a frequency band suitable for a photonic band.

There has been a theoretic counter argument as described in non-patent literature 6 for example, to the perfect imaging by the negative refraction lens, which lead to a controversy. However, in recent years, a theory of the negative refraction lens disclosed in non-patent literature 3 has been generally accepted.

In an optical system in which, an ordinary optical material is used, it is possible to create an aplanatic point, or in other words, a point at which, a spherical aberration and a coma aberration become zero simultaneously. An image by this optical system always becomes a virtual image. Here, when a negative refraction material is used, it is possible to form a real image by arranging an object plane at the aplanatic point (refer to non-patent literature 7 for example). In this manner, by using a negative refraction material, unique optical designing which was not available so far becomes possible.

Moreover, it has been known that for many metals, a real part of permittivity with respect to visible light becomes negative. For instance, according to non-patent literature 9, silver exhibits a negative permittivity for light of a wavelength in a range of 330 nm to 900 nm. Furthermore, according to non-patent literature 10, even in a chiral substance having a helical structure, there exists a photonic band exhibiting negative refraction.

Phenomenon of negative refraction has unique characteristics which are different from an ordinary optical material, such as having a negative angle of refraction, having a phase velocity and a group velocity in opposite directions, and an electric field, a magnetic field, and a wave number vector forming a left-handed system in this order.

A name of a material exhibiting negative refraction has not yet been established in general. Therefore, prefixing the abovementioned characteristics, a material exhibiting negative refraction is also called as a negative phase velocity material, a left-handed material, a backward-wave material, and a negative refraction material. In this specification, it will be treated as a type of such material exhibiting negative refraction. Such treatment does not contradict at all to a definition of the abovementioned material exhibiting negative refraction.

Moreover, there exist many names prefixed by a phenomenon of overlapping with names in which, a material or a structure is prefixed. For instance, a meta-material which is made of a metal resonator array is sometimes also called as a left-handed substance or a left-handed meta-material. Such materials are also to be included in materials exhibiting negative refraction.

In this manner, when a negative refraction lens which is formed of a negative refraction material is used, there is a possibility of realizing an imaging optical system of ultra-high resolution (perfect imaging) not constrained to diffraction limit (refer to non-patent literature 3, for example). Furthermore, even in a case of imaging only the propagating light, a unique optical design is possible (refer to non-patent literature 7, for example).

Non-patent literature 1: V. C. Veselago et al., Sov. Phys. Usp. 10, 509 (1968)

Non-patent literature 2: E. Hecht, "Optics", 4$^{th}$ ed. (Addison-Wesley, Reading, Mass., 2002)

Non-patent literature 3: J. B. Pendry, Phys. Rev. Lett. 85, 3966 (2000)

Non-patent literature 4: D. R. Smith et al., Phys. Rev. Lett. 84, 4184 (2000)

Non-patent literature 5: M. Notomi, Phys. Rev. B62, 10696 (2000)

Non-patent literature 6: P. M. Valanju et al., Phys. Rev. Lett. 88, 187401 (2002)

Non-patent literature 7: D. Schurig et al., Phys. Rev. E70, 065601 (2004)

Non-patent literature 8: D. R. Smith et al., Appl. Phys. Lett. 82, 1506 (2003)

Non-patent literature 9: "Latest Optical Technology Handbook" by Tsujiuchi Junpei et al., (Published by Asakura Shoten)

Non-patent literature 10: J. B. Pendry, Science 306, 1353 (2004)

Non-patent literature 11: S. A. Ramakrishna et al., Phys. Rev. B69, 115115 (2004)

As it has been mentioned above, the negative refraction lens forms an image in which, the high-frequency component is retained by transmitting the evanescent waves. However, for generating arbitrarily some sort of optical image having the high-frequency component by using a negative refraction lens, or for detecting the high-frequency component from an optical image generated from an object etc. by a negative refraction lens, there are following issues related to a method of lighting and a method of detection.

Firstly, let us consider a case in which, an attempt is made to detect a desired high-frequency component by an optical image generated from an object etc. by a negative refraction lens. The perfect imaging of the negative refraction lens is always an equal (same size) magnification imaging. Moreover, even when the uniformly magnified image is supposedly magnified by an ordinary magnifying optical system, the evanescent waves are not transmitted to the magnified image. Consequently, the high-frequency component is lost, and it is not possible to detect the high-frequency component from the magnified image.

In other words, for detecting information of a certain desired high-frequency component, it is necessary that a detector is placed directly on an equal magnified-image plane by the negative refraction lens, and that the detector has a detection band spatial resolution larger than the desired high-frequency component.

Such type of problem exists similarly when an attempt is made to generate arbitrarily on an object, some sort of an optical image having the desired high-frequency component by using the negative refraction lens. In other words, it is necessary that illuminating light is modulated spatially on the equal magnified imaging plane (conjugate plane of object which is intended) by the negative refraction lens, and that a light source (an illuminating light source) has a modulation band (spatial resolution) larger than the desired high-frequency component.

Concrete problems in the detector and the light source in a case of detecting the high-frequency component of an optical image by the negative refraction lens will be described below, taking a microscope as an example. A two-point resolution of a microscope having an ordinary water-immersion objective lens is approximately 0.3 µm. The wavelength is let to be 0.5 µm, the numerical aperture is let to be 0.75, and refractive index of water is let to be 1.333.

Whereas, for a microscope with a negative refraction lens as the objective lens, to have ten times two-point resolution of the ordinary microscope, or in other words, to have two-point resolution of 0.03 µm, the detector or the light source is required to have resolution higher than that. This means that, in a case of using a two-dimensional image pickup element such as a CCD (Charge Coupled Device) and a CMOS (Complementary Metal Oxide Semiconductor), a pixel interval (pixel dimension) has to be half of 0.03 µm, or in other words, not more than 0.015 µm.

Moreover, even in a case of a scanning microscope which detects a signal of an image by scanning by moving one or a plurality of detectors or light sources relatively with an object, a size of the detector and the light source has to be not more than 0.015 µm similarly as in a case of the image sensor described above.

However, manufacturing of such extremely small detector and light source is not easy. For instance, the smallest pixel interval in a CCD which is currently being used practically is approximately 2 µm. Consequently, for a CCD to achieve the resolution shown in the abovementioned example, or in other words, to achieve the pixel interval not more than 0.015 µm, it is necessary to have high densification of not less 130 times now onward. This technological degree of difficulty is extremely high.

Moreover, an SNOM (Scanning Near-Field Optical Microscope) is available as an optical microscope of super resolution which is currently being used practically. Even for an aperture portion of a front end of a probe which is used as a detector and a light source in the SNOM, a diameter is approximately 0.05 µm to 0.1 µm. This is three times larger than the condition, that is, the diameter of the detector and the light source is not more than 0.015 µm, shown in the abovementioned example.

The present invention is made in view of the abovementioned issues, and an object of the present invention is to provide a light system, a method of lighting which having a spatial resolution appropriate for a high-frequency component by the evanescent waves in a negative refraction lens, and a scanning optical microscope.

DISCLOSURE OF THE INVENTION

To solve the abovementioned issues and to achieve the object, according to the present invention, there is provided a lighting system including a light emitter which includes a luminescent material which emits light when an energy is applied thereon, an optical system which includes an optical element which is formed of a material exhibiting negative refraction, and which is for projecting the light emitted from the light emitter, on an object, wherein a size of the light emitter is smaller than a wavelength of the light.

According to a preferable aspect of the present invention, it is desirable that the light emitter is (light emitters are) dispersed in a light emitting layer in a form of a film.

Moreover, according to a preferable aspect of the present invention, it is desirable that the light emitter includes a light emitting material which emits light of a wavelength $\lambda_2$ which differs from a wavelength $\lambda_1$ when an excitation light of a predetermined wavelength $\lambda_1$ is irradiated.

According to a preferable aspect of the present invention, it is desirable that the light emitter includes at least one of a fluorescent substance, a phosphorescent substance, a non-linear optical material, and an active material such as a laser medium.

According to a preferable aspect of the present invention, it is desirable that the light emitter includes a quantum dot laser, and that the energy is a carrier current.

Moreover, the present invention provides a method of lighting including a light emitting step of irradiating light by applying an energy to a light emitter which includes a light emitting material which emits light, and which is smaller than a wavelength of the light, and a projection step of projecting on an object, light from the light emitter via an optical system which includes an optical element which is formed of a material exhibiting negative refraction.

Furthermore, the present invention provides a scanning optical microscope including
a lighting system according to the present invention described above, and
an optical detector which is capable of detecting light of a wavelength same as the light irradiated on the object.

According to the present invention, there can be provided a lighting system having a high spatial resolution appropriate for a high-frequency component due to evanescent waves in a negative refraction lens, a method of lighting, and a scanning optical microscope.

BEST MODE FOR CARRYING OUT THE INVENTION

Exemplary embodiments according to the present invention will be described below in detail by referring to the accompanying diagram. However, the present invention is not restricted by the embodiments described below.

First Embodiment

Figure 1:
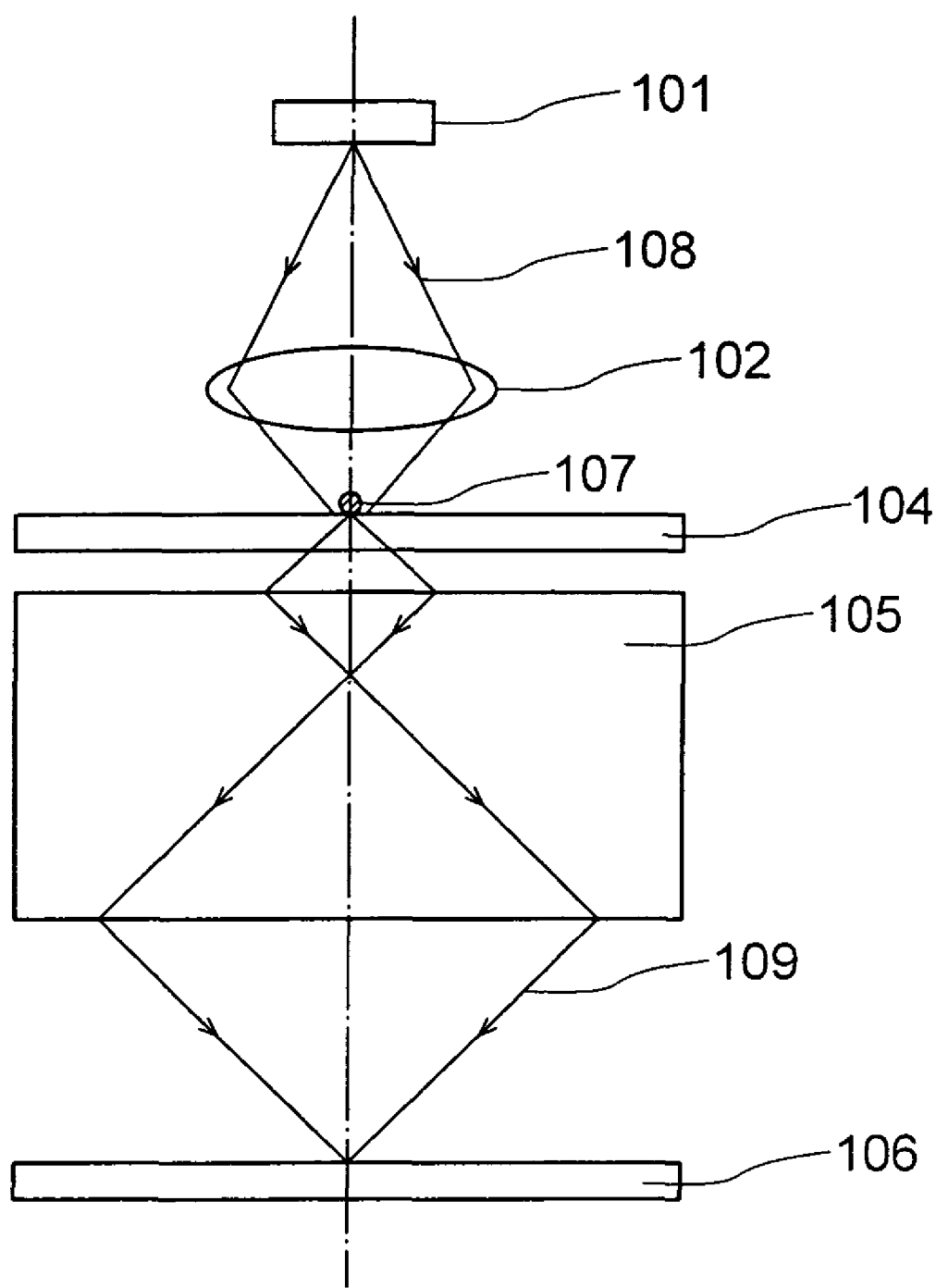
FIG. 1 is a diagram showing an example of a structure of a lighting system according to a first embodiment of the present invention.

FIG. 1 shows a structure of a lighting system according to a first embodiment. A light source 101 is an illuminating light source such as a halogen lamp, a light emitting diode (LED), a super luminescent diode (SLD), and a laser oscillator, and since the laser light has a superior spatial coherence, it is preferable from a point of forming a beam spot having a higher energy density. A light emitter excitation light 108 of a wavelength $\lambda 1$ which the light source 101 has emitted, is focused on a light emitter 107 by a collective lens 102. The light emitter 107 is a fine particle made of a florescent substance or a phosphorescence substance which emits light of a wavelength longer than excitation light by irradiating the excitation light, and a size of the light emitter 107 is smaller than a wavelength of the fluorescent light or the phosphorescent light emitted by the light emitter 107.

As the light emitter 107, it is possible to use a so-called fluorescent bead in which, plastic particles of a material such as polystyrene are let to be a base material, and this base material is made to contain a fluorescent dye. Moreover, it is also possible to use a so-called quantum dot which is a particle of a size of few nm made of a semiconductor material. As a quantum dot, particularly, particles of few nm made of CdSe (cadmium selenide) have been known to emit fluorescent light due to irradiation of ultraviolet light or blue light. The quantum dot has a merit of emitting fluorescent light with a higher efficiency as compared to an ordinary fluorescent dye, and color fading does not occur. Furthermore, there is a merit that by adjusting a size of particles at the time of manufacturing in a range of about 2 nm to 5 nm, it is possible to control freely a wavelength of the fluorescent light in a range of 470 nm to 610 num.

The light emitter 107 is held on a substrate 104 made of an optical material such as glass and plastic. When the light emitter excitation light 108 of the wavelength $\lambda_1$ is irradiated, the light emitter 107 emits fluorescent light of a wavelength $\lambda_2$. Since a diameter a of the light emitter 107 is formed to be smaller than the wavelength $\lambda_2$, the fluorescent light includes evanescent waves, and advances through the substrate 104 as an object illuminating light 109 having the light emitter 107 to be a point light source.

A negative refraction lens 105 is arranged to form an image of the light emitter 107 on a surface of an object 106. Refractive index of the negative refraction lens and an outer medium (air) is let to be $n_1$, and $n_2$ respectively, and it is assumed that a so-called condition for perfect imaging which is $n_1+n_2=0$ is satisfied. In other words, not only a propagating-light component but also an evanescent-light component in an object illuminating light 109 is also collected simultaneously, and a beam spot of a size almost same as the light emitter 107 is formed on the surface of the object 106.

In the first embodiment, it is possible to use various objects which need an illumination in a form of a spot, as the object 106. However, according to the field of application, reaching of the light emitter excitation light 108 to the object 106 might not be preferable. For example, when the field of application is photolithography, and the object 106 is a photosensitive resist, only the object illuminating light 109 is to be irradiated on the object 106, and the light emitter excitation light 108 is not to be irradiated. This is because, a beam spot which the light emitter excitation light 108 forms on the object 106 is larger than a beam spot which the object illuminating light 109 forms on the object 106, and therefore, a resolution of the light emitter excitation light 108 as the photolithography is damaged. Consequently, in such case, it is preferable to dispose a band-pass filter which shields the light emitter excitation light 108 at any position between the substrate 104 and the object 106. Moreover, a band-pass filter which shields the light emitter excitation light 108 as the substrate 104 may be used.

Figure 2:
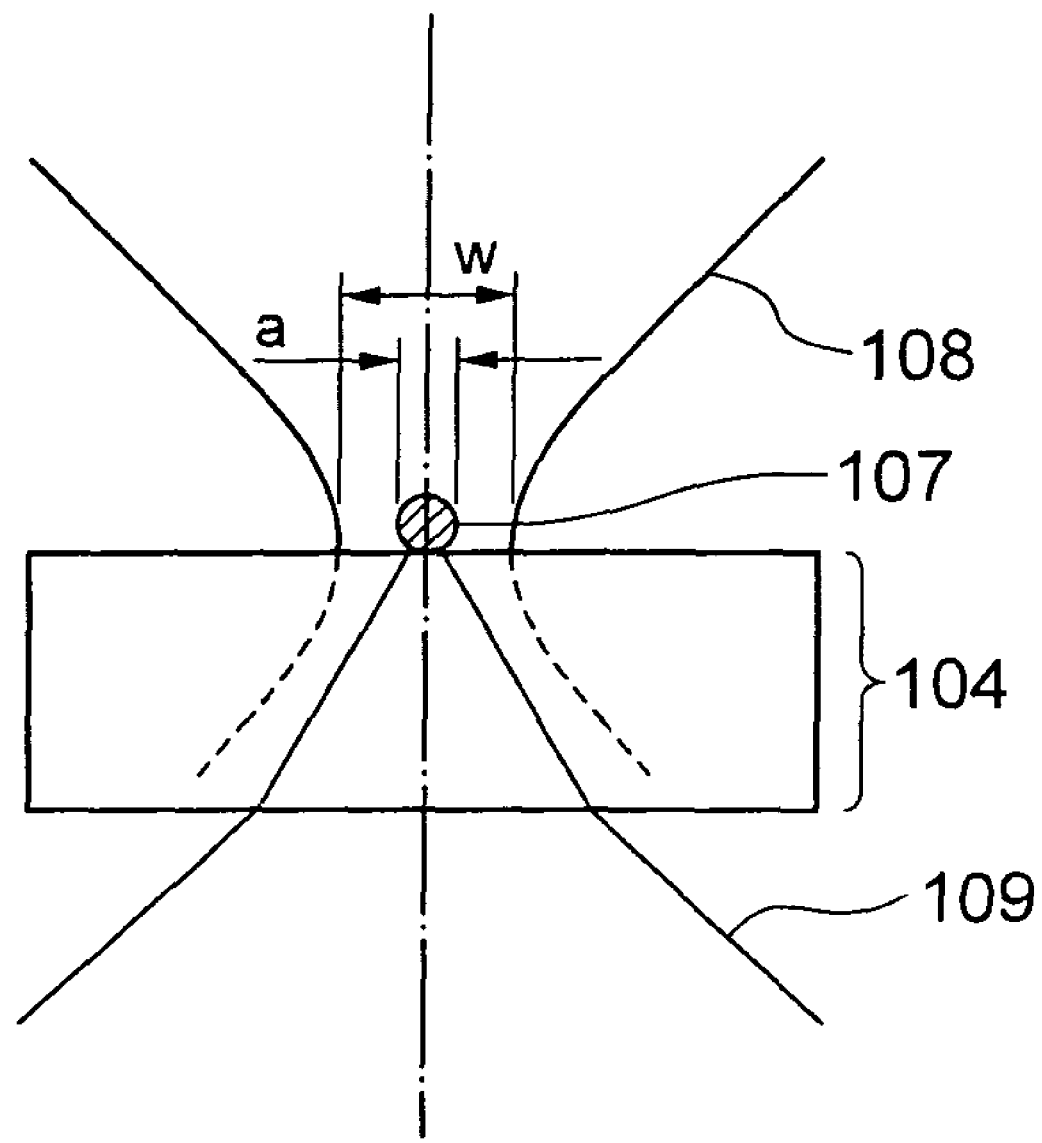
FIG. 2 is an enlarged view of a light emitter and a substrate of the first embodiment.

FIG. 2 is a diagram in which, the light emitter 107 and the substrate 104 in FIG. 1 are enlarged. When a spherical aberration of the collective lens 102 has been corrected appropriately, a beam-waist diameter w at a focal point thereof is about $\lambda_1$/NA (NA denotes a numerical aperture of the collective lens 102). When a diameter a of the light emitter 107 is smaller as compared to the beam waist diameter, it is possible to form on the object 106 a minute beam spot beyond a diffraction limit. At this time, when the diameter a of the light emitter 107 is too small, since a fluorescence intensity becomes weak, it is preferable that the diameter a of the light emitter 107 is larger than w/100, and it is even more preferable that the diameter a of the light emitter 107 is larger than w/10. However, from a point of achieving even finer beam spot, it is preferable that the diameter a is as small as possible, and particularly, when $a \geq w$, it is needless to mention that an effect of the present invention is not achieved.

Second Embodiment

Figure 3:
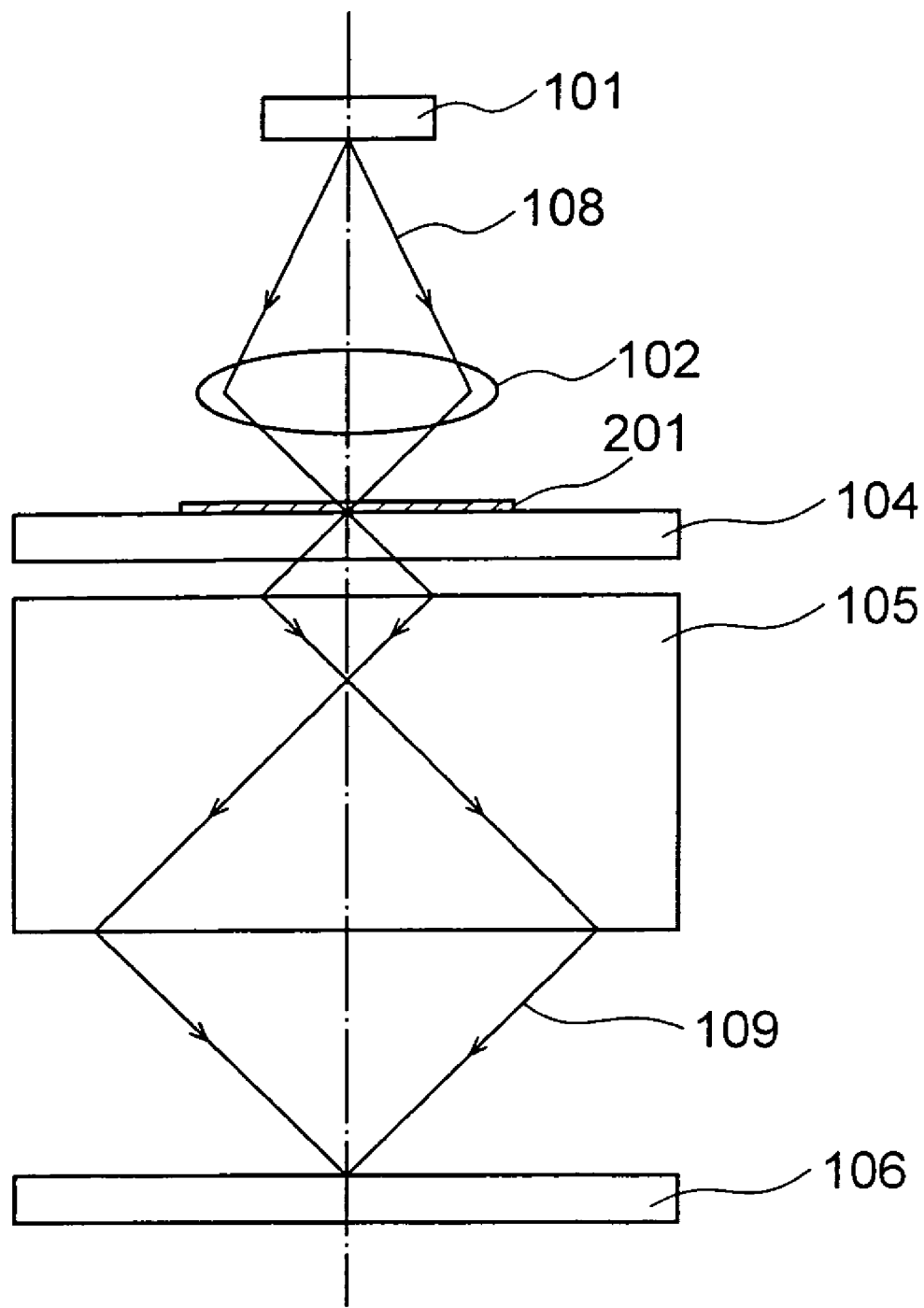
FIG. 3 is a diagram showing an example of a structure of a lighting system according to a second embodiment of the present invention.

Next, a second embodiment of the present invention will be described below. Same reference numerals are assigned to components which are same as in the first embodiment, and repeated description is omitted. FIG. 3 shows a structure of a lighting unit according to the second embodiment. A structure of the second embodiment is basically same as the structure of the first embodiment, and differs at a point of having a light emitting layer 201. The light emitting layer 201 is a film formed on the substrate 104, in which, a plurality of light emitters 107 is disposed by being dispersed spatially in a transparent substance.

Figure 4:
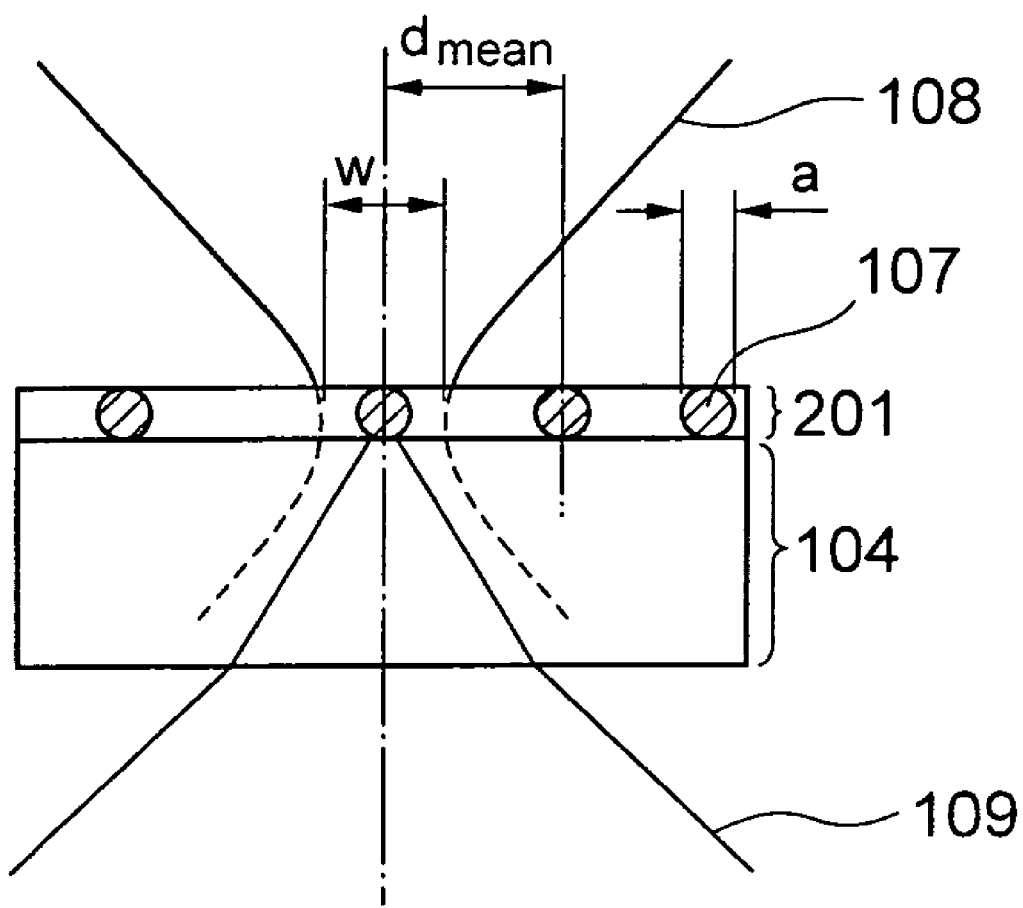
FIG. 4 is an enlarged view of a light emitting layer and a substrate of the second embodiment.

FIG. 4 is a diagram in which, the light emitting layer 201 and the substrate 104 in FIG. 3 are enlarged. The light emitting layer 201 is formed by making the plurality of light emitters 107 to be dispersed in a film made of a transparent material.

The light emitter 107 being extremely small, when there is only one light emitter held on the substrate 104 as in the first embodiment (FIG. 1 and FIG. 2), it becomes difficult to make coincide the light emitter 107 at a focusing position of the light emitter excitation light 108. Whereas, in the second embodiment (FIG. 3 and FIG. 4), since the light emitting layer 201 includes the plurality of light emitters 107, an optical axis adjustment of the lighting system becomes easy, and also the holding of the light emitter 107 by the substrate 104 becomes easy, making it preferable. This is because, the light emitter is to be dispersed at a predetermined density, in a radiation curable resin, and this is to be coated one by one on the substrate 104, and the resin is to be cured by irradiating the radiation. However, it is necessary to stir so that the light emitters become as uniform as possible. And at this time, when a plurality of light emitters exists in a beam spot of the light emitter excitation light 108, a beam spot of the object illuminating light 109 on the object 106 becomes large, and the spatial resolution is damaged. To avoid this, it is preferable that an average distance $d_{mean}$ between the light emitters 107 is larger than the beam-waist diameter w. Furthermore, it is more preferable when a minimum distance $d_{min}$ between the light emitters 107 is larger than the beam-waist diameter w.

Figure 5:
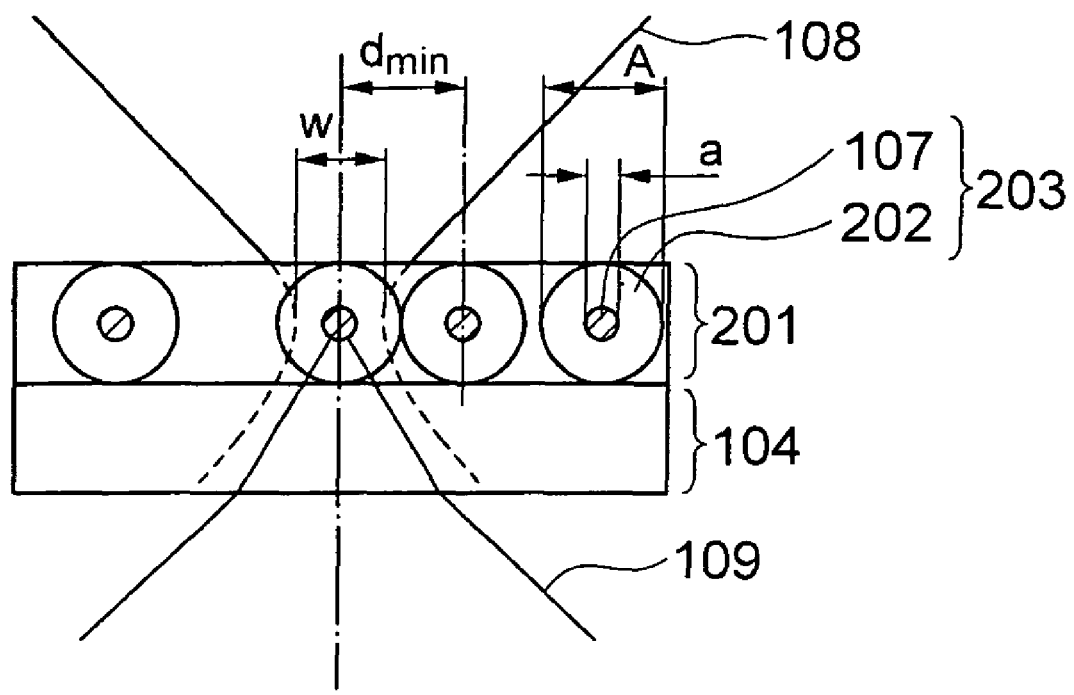
FIG. 5 is a diagram showing another example of the light emitting layer according to the second embodiment.

FIG. 5 indicates even more preferable structure of the light emitting layer 201 in the second embodiment. In this diagram, reference numeral 203 denotes a transparent bead which includes a light emitter made of a transparent bead 202 which is a spherical body made of a transparent substance, and which holds the light emitter 107 at a central portion thereof. The light emitting layer 201 in this diagram (in FIG. 5), is formed by dispersing the plurality of transparent beads 203 which include light emitters in a film made of a transparent material.

In a case of dispersing the light emitters 107 directly in the light emitting layer 201 as in FIG. 4, it is not easy to control accurately a distance d between the light emitters 107, and particularly, the plurality of light emitters 107 are adhered mutually, and a phenomenon of a large lump formation occurs frequently. Whereas, in the structure shown in FIG. 5, the minimum distance $d_{min}$ between the light emitters 107 is equal to a diameter A of the transparent bead. In other words, by making the diameter A to be larger than the beam-waist diameter w, it is possible to prevent all the time, the plurality of light emitters from existing in one beam spot of the light emitter excitation light 108.

Third Embodiment

Figure 6:
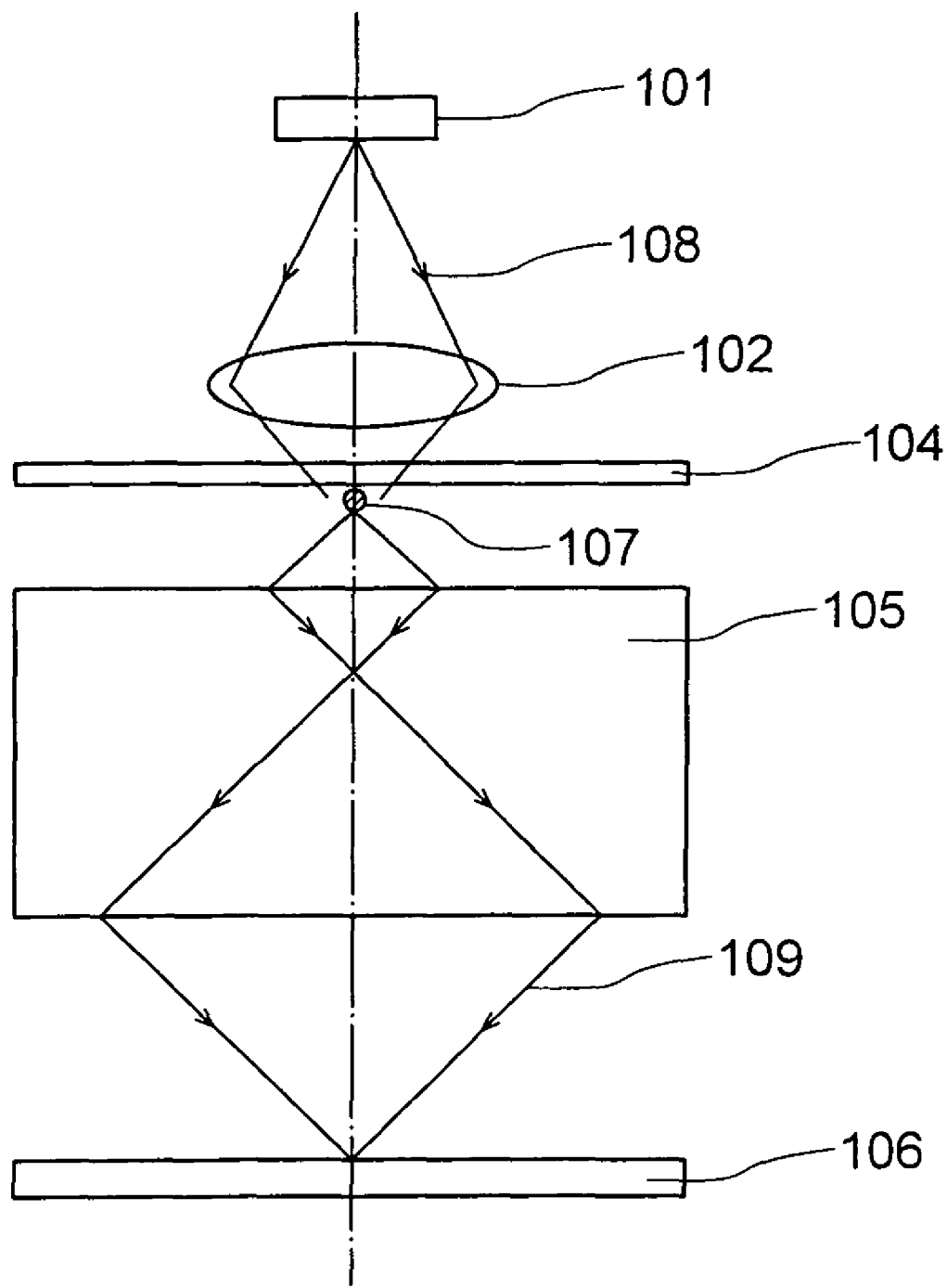
FIG. 6 is a diagram showing an example of a structure of a lighting system according to a third embodiment of the present invention.
Figure 7:
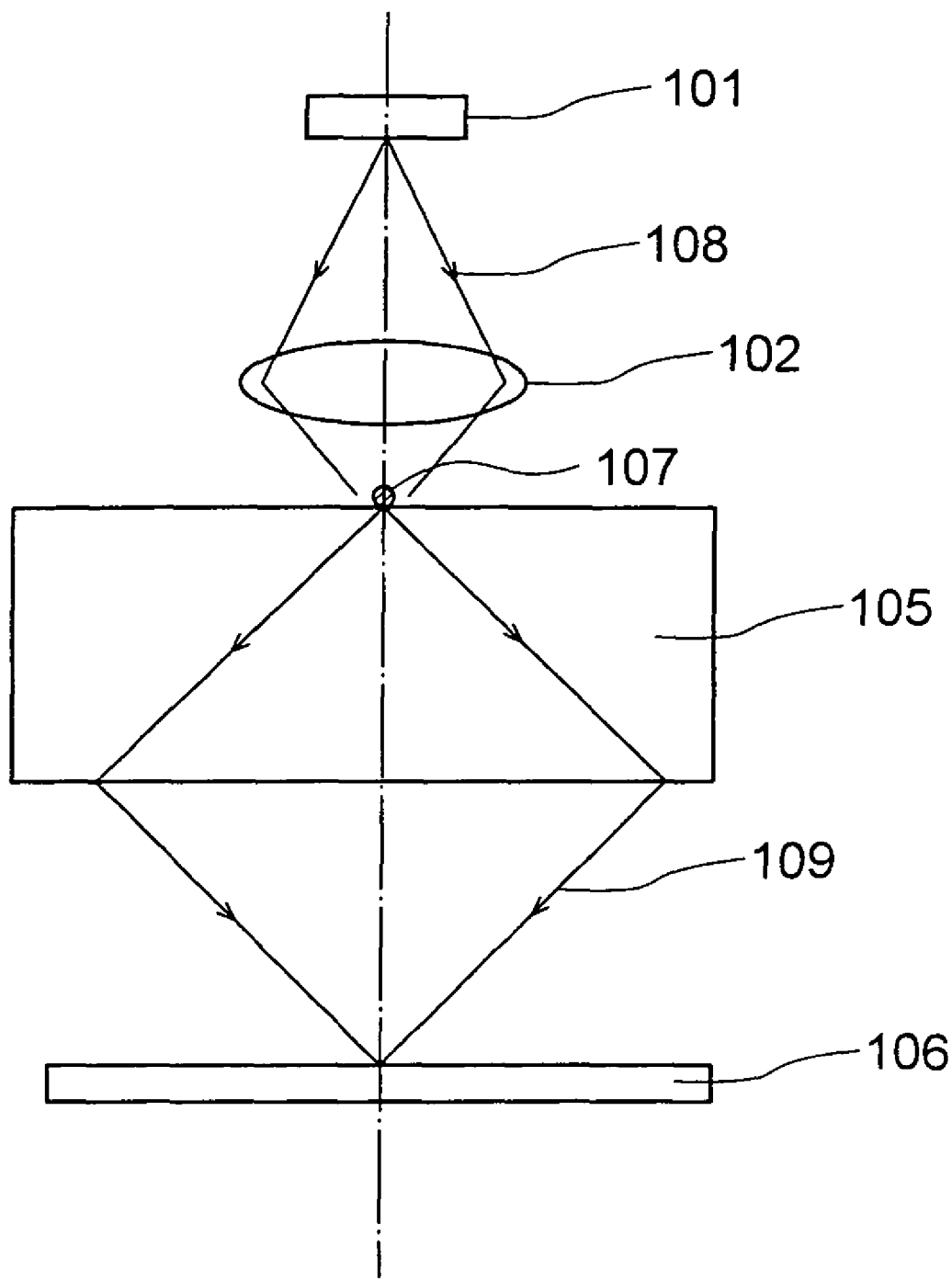
FIG. 7 is a diagram showing another example of a structure of the lighting system according to the third embodiment.

Next, a third embodiment of the present invention will be described below. Same reference numerals are assigned to components which are same as in the embodiments described above, and the repeated description is omitted. In the first embodiment (FIG. 1) and the second embodiment (FIG. 3), since the fluorescent light emitted by the light emitter 107 passes through the substrate 104, there is a possibility that the beam spot formed on the object 106 is blurred due to scattering and absorption of the fluorescent light inside the substrate, or due to the scattering and reflection at a surface of the substrate. Therefore, as shown in FIG. 6, when the light emitter 107 is held at a rear side of the substrate 104 (as seen from a light source side), it is possible to avoid an occurrence of the blurring. Moreover, for achieving the same effect, as shown in FIG. 7, a structure in which, the negative refraction lens 105 holds the light emitter 107, without using the substrate 104 is also possible.

Fourth Embodiment

Figure 8:
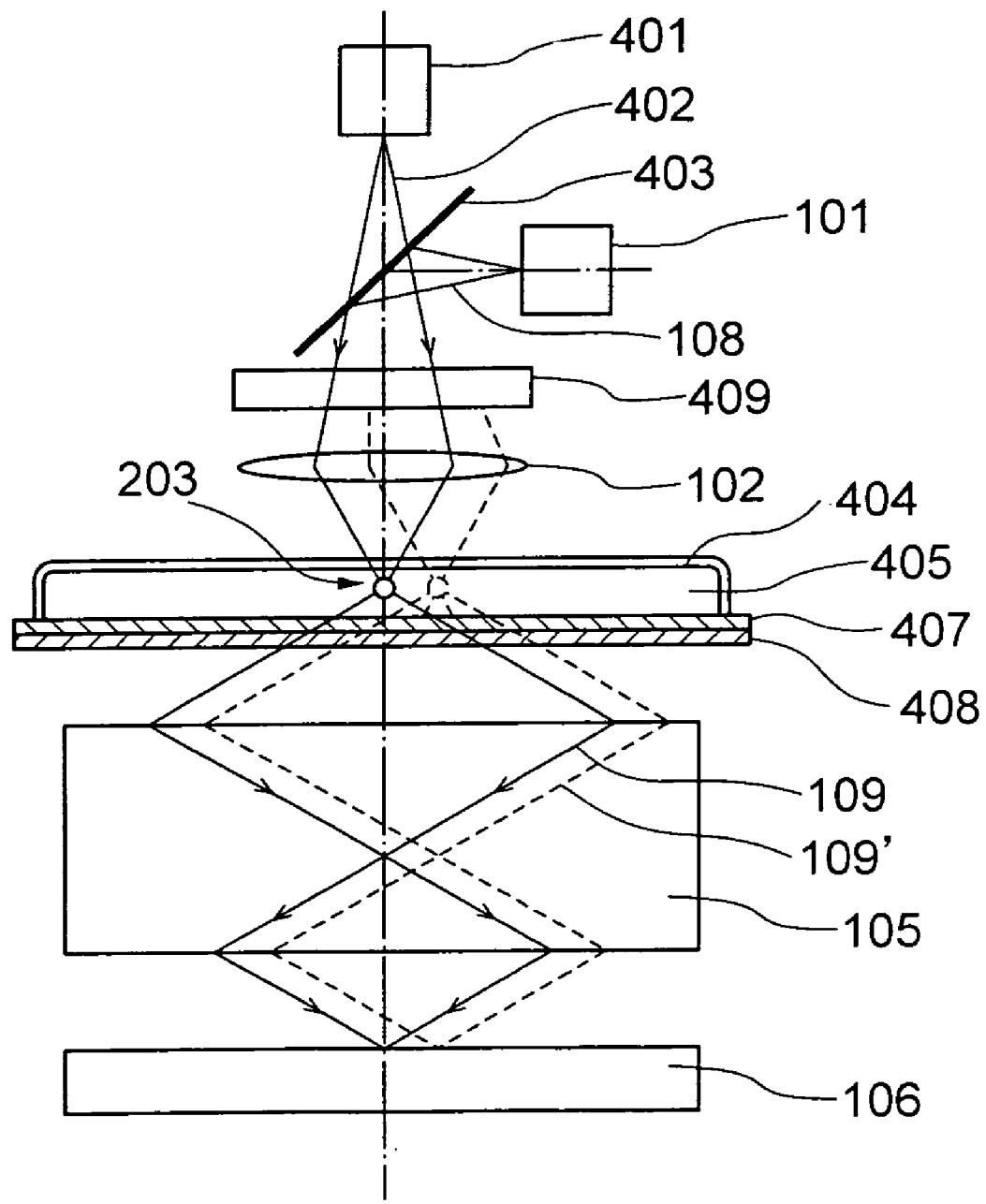
FIG. 8 is a diagram showing an example of a structure of a lighting system according to a fourth embodiment of the present invention.

Next, a fourth embodiment of the present invention will be described below. Same reference numerals are assigned to components which are same as in the embodiments described above, and the repeated description is omitted. FIG. 8 indicates a structure of a lighting system according to the fourth embodiment.

In this diagram, reference numeral 401 denotes a trap-light source which emits light of a wavelength difference from a light-emission wavelength band of the light emitter 107, and a wavelength band having an excitation sensitivity. Reference numeral 402 denotes trap light which is emitted from the trap-light source. Reference numeral 403 denotes a dichroic mirror which makes the light emitter excitation light 108 and the trap light 402 superpose in one beam. Here, the excitation-light source 101 and the trap-light source 401 are disposed at a positional relationship such that a confocal is formed. Reference numeral 409 denotes a scanner which scans the beams superposed in one beam, in a direction orthogonal to the optical axis. Reference numeral 404 denotes a transparent container which is made of a transparent material, and which encloses inside a transparent liquid 405 and a transparent bead 203 including a fluorescent material. Reference numeral 407 denotes light emitter excitation light cutting filter which is positioned toward an object side of the transparent container 404, and which shields the light emitter excitation light 108. Reference numeral 408 denotes a trap-light cutting filter which is positioned toward the object side of the transparent container 404, and which shields the trap light 402.

Figure 9:
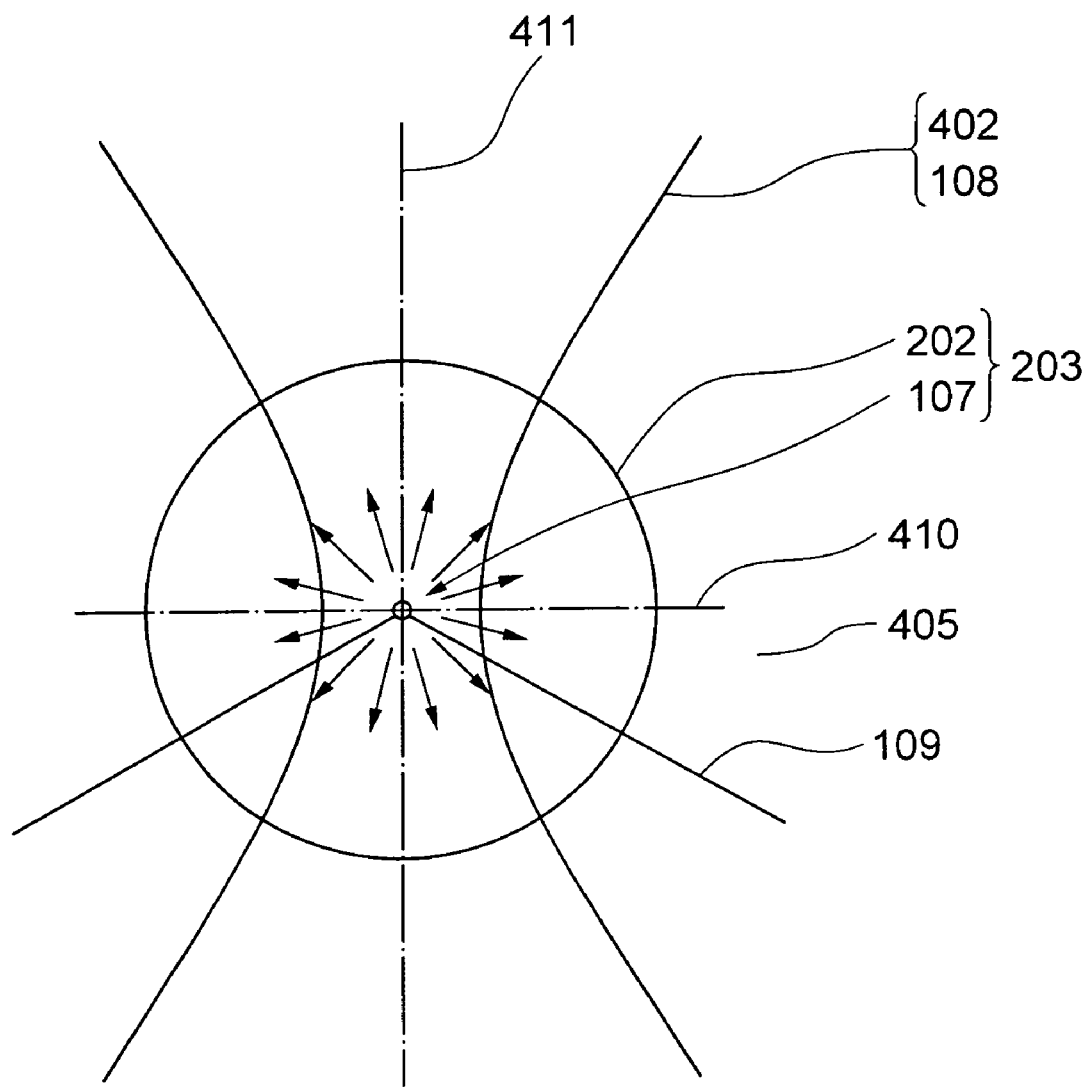
FIG. 9 is a diagram for describing by enlarging a transparent bead which includes a light emitter according to the fourth embodiment.

In this embodiment, the transparent bid 203 including the light emitter, normally floats in the transparent liquid 404, and when the trap light 402 is once illuminated thereon, due to a so-called light-trapping effect (or light pincette effect) on the transparent bead 202, the transparent bead 203 including light emitter is drawn to a position (refer to FIG. 9) at which the maximum trap light 402 is collected intensely, or in other words, a position at which, a beam center axis 411 and a beam-waist positions 410 are mixed. As a result, the light emitter 107 is also positioned where the maximum light emitter excitation light 108 is collected intensely. This is because, the light emitter 107 is positioned at a center of the transparent bead 202, and further, because the trap light 402 and the light emitter excitation light 108 are confocal.

This embodiment has a peculiarity that positioning adjustment of the light emitter and the light emitter excitation light is easy. In other words, because of a need to increase an output of the object illuminating light 109, it is necessary that the light emitter 107 is kept at a position at which the maximum light emitter excitation light 108 is collected intensely, and in the case of the first embodiment and the second embodiment, a manual adjustment or a means of an active control in which some sort of actuator is used has been necessary for realizing this. Whereas, in the fourth embodiment, this is realized automatically by the light-trapping effect.

In the fourth embodiment, when a position at which the beam spot is irradiated is moved by the scanner 409, the transparent bead 203 including the emitter also moves following the position at which the beam spot is irradiated, and as a result, the object illuminating light 109 also moves to become an object illuminating light 109' for example. In other words, by scanning the light emitter excitation light and the trap light, it is possible to scan the object illuminating light 109. Moreover, in the fourth embodiment, since the trap-light source 401 is provided independently of the excitation-light source 101, even when the light emitter excitation light 108 is stopped, it is possible to continue to hold the transparent bead 203 including the emitter at a desired position by the trap light. Furthermore, in the fourth embodiment, out of the three types of lights directed toward the object 106, namely, the trap light 401, the light emitter excitation light 108, and the object illuminating light 109, since the trap light 401 is shielded by the trap-light cutting filter 408, and the light emitter excitation light 108 is shielded by the light emitter excitation light cutting filter 407, the light reaching the object 106 is only the object illuminating light 109. These effects make it possible to control independently an intensity of the light illuminating light 109 and the scanning on the object 106, and since the light emitter excitation light 108 and the trap light 402 which are controlling means thereof do not reach the object 106, it has a peculiarity of not hindering an effect of the object illuminating light.

Fifth Embodiment

Figure 10:
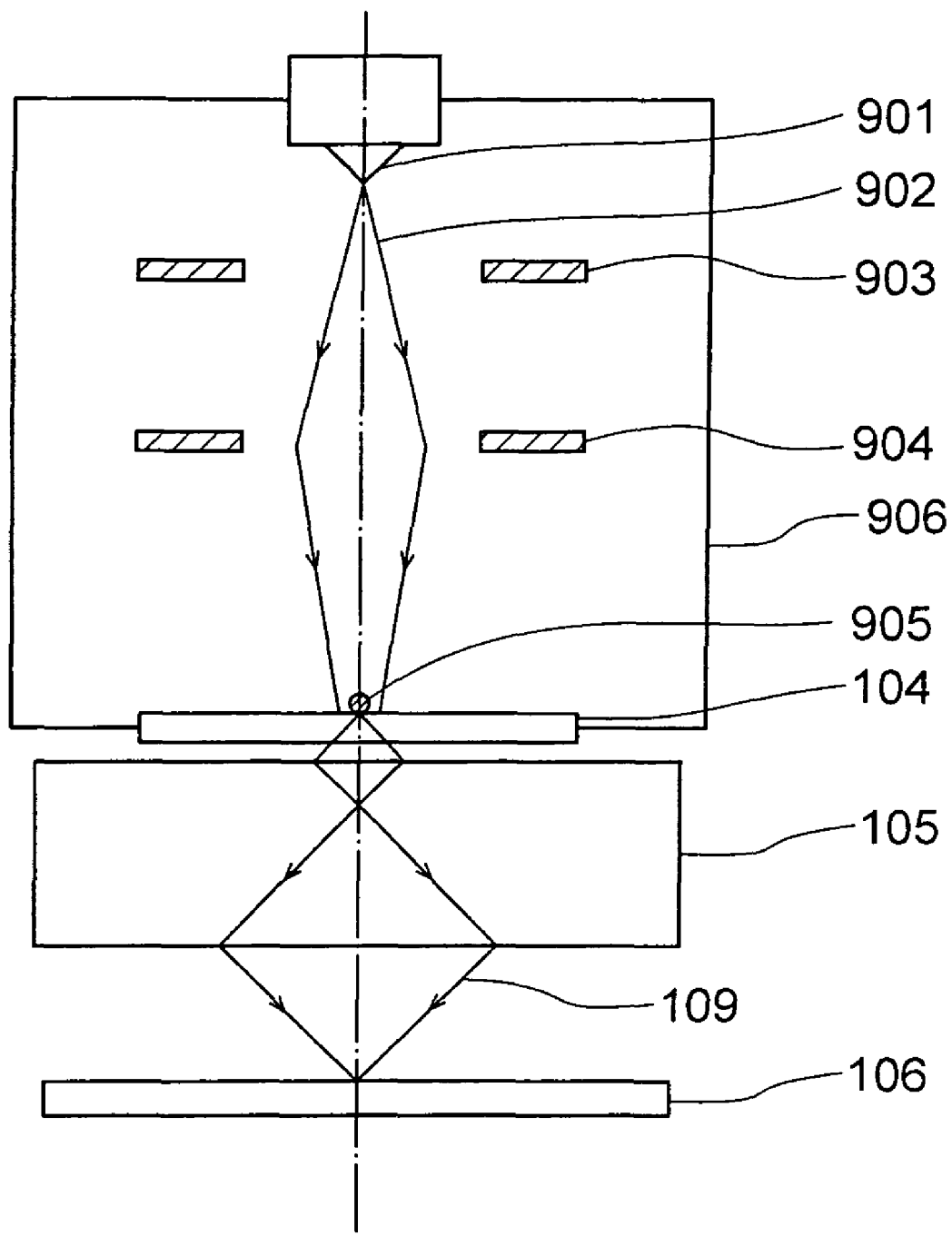
FIG. 10 is a diagram showing an example of a structure of a lighting system according to a fifth embodiment of the present invention.

Next, a fifth embodiment of the present invention will be described below. Same reference numerals are assigned to components which are same as in the embodiments described above, and the repeated description is omitted. FIG. 10 shows a structure of a lighting unit of the fifth embodiment. In this diagram, reference numeral 901 denotes a cathode which discharges electrons, reference numeral 902 denotes an electron beam formed by electrons discharged, reference numeral 903 denotes a electrode (an accelerating electrode) which applies an acceleration voltage to the electrons discharged, reference numeral 904 denotes an electron lens which converges the electron beam, reference numeral 905 denotes a light emitter made of a material which emits light by irradiation of the electron beam, reference numeral 104 denotes a substrate which functions as an optical window made of an optically transparent material, reference numeral 906 denotes a vacuum chamber for maintaining to be low an air pressure in a passage of the electron beam, reference numeral 109 denotes an object illuminating light which is emitted by the light emitter 905, reference numeral 105 denotes a negative refraction lens made of a negative refraction material, and reference numeral 106 denotes an object which is subjected to irradiation of light.

A material of the emitter 905 may be any material provided that it is a material which exhibits a so-called cathode luminescence in which, light is emitted by irradiation of an electron beam. As a material exhibiting cathode luminescence, a fluorescent substance and a phosphorescence substance are available.

Regarding a type of the substrate 104, for preventing charging of the light emitter 905 due to the irradiation of the electron beam 902, it is desirable to form a transparent electroconductive thin film on a surface on an upper side in the diagram, in other words, a side which receives the irradiation of the electron beam, and to maintain the vacuum chamber 906 and the electrode 903 at a same electric potential. An effect of the object illuminating light 109 on the substrate 104, the negative refraction lens 105, and the object 106 is same as in the first embodiment.

In the fifth embodiment, as an excitation means of the light emitter 905, since an electron beam, and not the excitation light is used, the object 106 does not receive an irradiation of the light emitter excitation light 108 as in the first embodiment. Consequently, even in a case of applying in a field such as photolithography in which, a resolution of the irradiation of the light emitter excitation light 108 to the object 106 is damaged, the fifth embodiment has a peculiarity that, it is not necessary to use a band-pass filter which shields the light emitter excitation light as in the case in the first embodiment.

Sixth Embodiment

Figure 11:
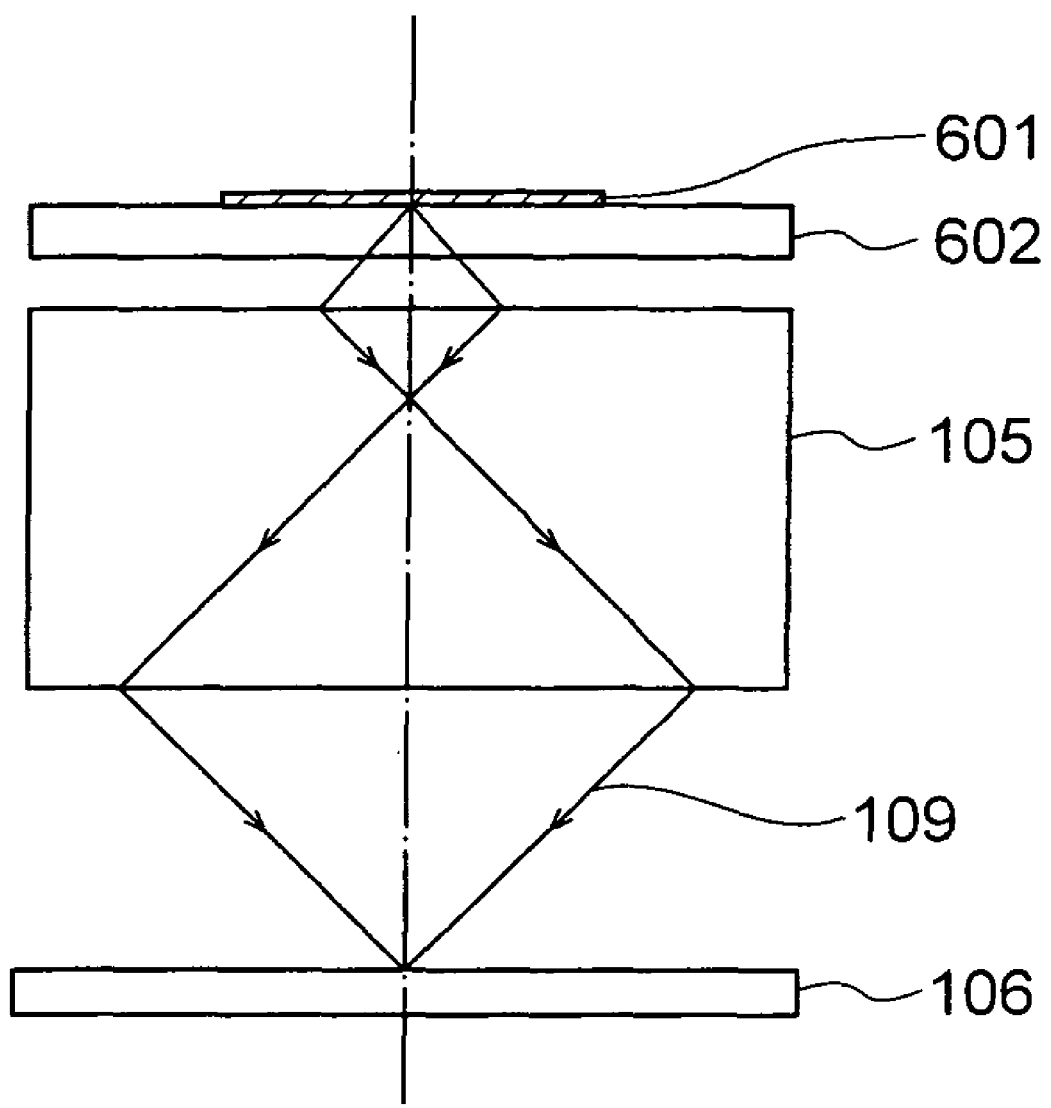
FIG. 11 is a diagram showing an example of a structure of a lighting system (when a quantum dot laser is used as a light emitting layer) according to a sixth embodiment of the present invention.
Figure 12:
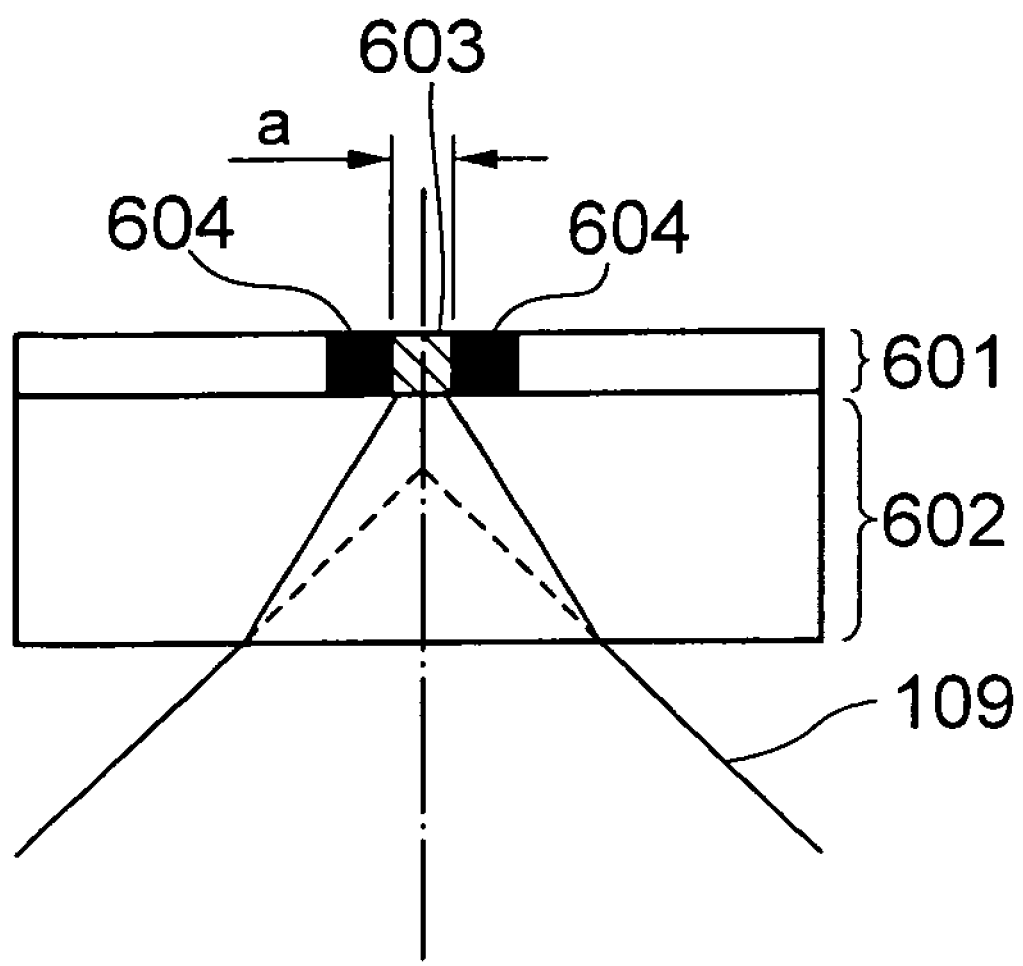
FIG. 12 is an enlarged view of a light emitting layer and a substrate according to the sixth embodiment.

Next, a sixth embodiment of the present invention will be described below. Same reference numerals are assigned to components which are same as in the embodiment described above, and the repeated description is omitted. A structure in a case of using a quantum dot laser as a light emitting layer is shown in FIG. 11. The object illuminating light 109 emitted from a light emitting layer 601, upon passing through a substrate 602, is collected at a surface of the object 106 by the negative refraction lens 105. FIG. 12 is a diagram in which the light emitting layer 601 and the substrate 602 are enlarged. A quantum dot laser 603 is formed on the light emitting layer 601, and by a carrier current being injected from an electrode 604 shown by a black color in the diagram, laser beam is emerged from a light emitting area (an active area) shown by oblique lines in the diagram. When a size a of the light emitting area is smaller than a laser wavelength λ, the laser beam which includes evanescent waves is collected on the surface of the object 106 by the negative refraction lens 105, and a formation of a minute beam spot beyond the diffraction limit is possible.

In a case of using the quantum dot laser as a light emitting layer, since the light is emitted by a current injection, the light source 101 and the collective lens 102 in FIG. 1 become unnecessary, and there is a merit that the system can be made small. Moreover, similarly as in the fifth embodiment, since the excitation light is not used, even when it is a field of application in which the excitation light damages the resolution of the system as in the lithography, there is a merit that an excitation light shielding filter is unnecessary. Apart from this, regarding modified embodiments such as in a case of arranging a plurality of quantum dot lasers in a line, and forming the light emitting layer on a rear side of the substrate or on the negative refraction lens, it is applicable similarly as in the second embodiment and the third embodiment.

Seventh Embodiment

Figure 13:
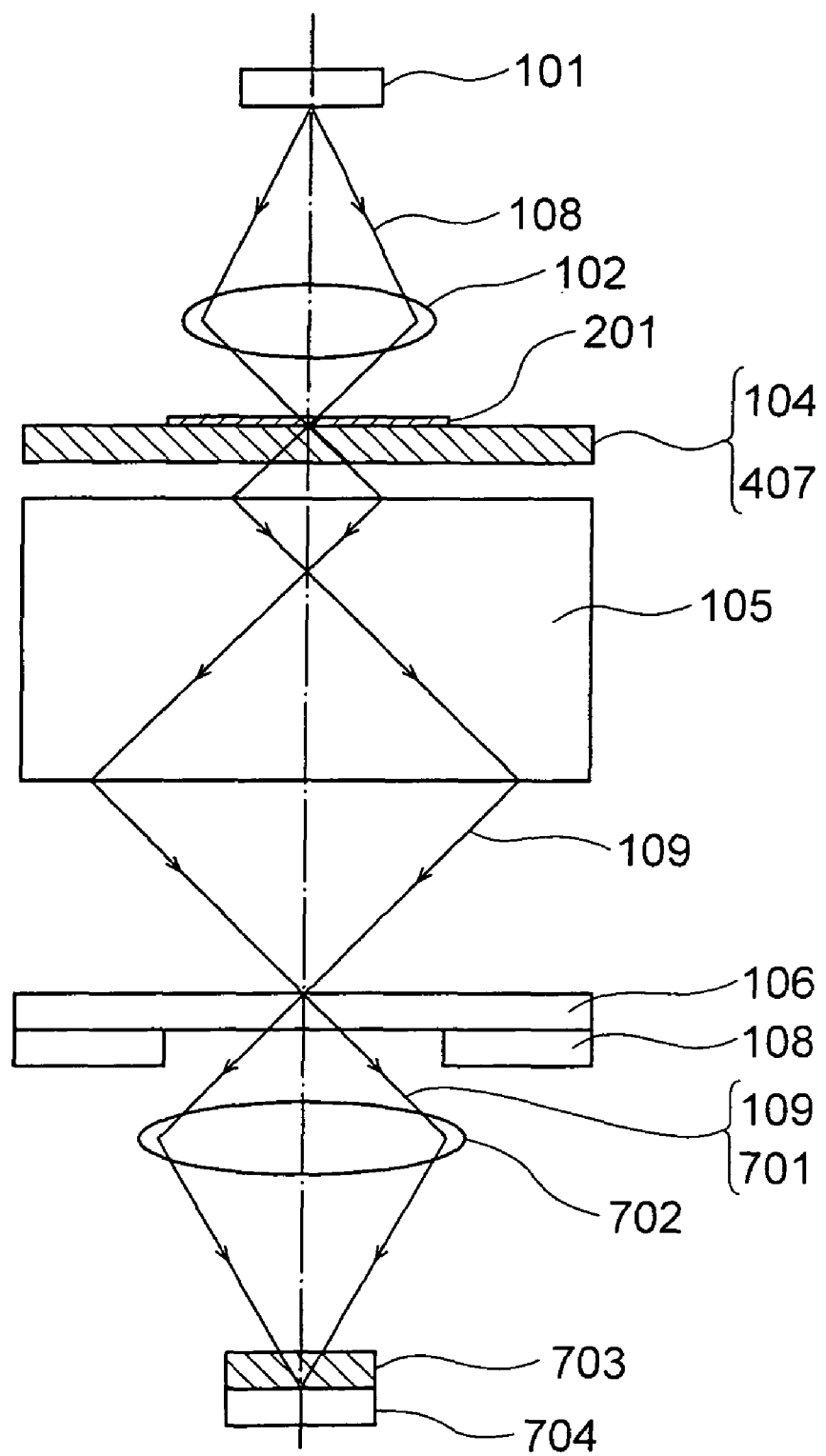
FIG. 13 is a diagram showing an example of a structure of a scanning fluorescence microscope according to a seventh embodiment of the present invention.

Next, a seventh embodiment of the present invention will be described below. Same reference numerals are assigned to components which are same as in the embodiments described above, and repeated description is omitted. A structure in which, the lighting system according to the present invention is used as a light source for a scanning fluorescence microscope is shown in FIG. 13. An optical path from the light source 101 up to the object 106 being described in the first embodiment, the description thereof is omitted here. The object 106 is placed on a stage 108 which is movable, and by moving two-dimensionally on a plane in a direction orthogonal to the optical axis, it is possible to scan a predetermined area. Here, the object 106 is a specimen for a fluorescence microscope. Moreover, the substrate 104 also functions as a fluorescent material excitation light cutting filter 407.

The object illuminating light 109 emitted from the light emitting layer 201 is subjected to excitation-illumination, and accordingly, the object 106 emits an object light (fluorescence) 701. Since fluorescent material excitation light 108 is shielded by the fluorescent material excitation light cutting filter 407 integrated with substrate 104, it doesn't reach the object 106.

By collecting a part of the object light (fluorescence) 701 by an object light collective lens 702, and detecting by an optical detector 704, fluorescence information of the object 106 is detected. The object illuminating light 109 being shielded by an object illuminating light cutting filter 703, does not reach the optical detector 704.

A fluorescence microscope image is observed by repeating the abovementioned detection operation by moving the stage 108. As it has been described in the first embodiment, since the beam spot irradiated on the object 106 is fine beyond the diffraction limit, a super-resolution imaging is possible by the measurement. Here, as the fluorescent material excitation light cutting filter 407 and the object illuminating light cutting filter 703, it is possible to use a multilayer dielectric filter and an absorption filter by a color glass for example, or a diffraction grating etc. Moreover, as the optical detector 704, a device such as a photomultiplier tube, a photodiode, an avalanche photodiode (APD), and a charge coupled device (CCD) can be used.

Eighth Embodiment

Figure 14:
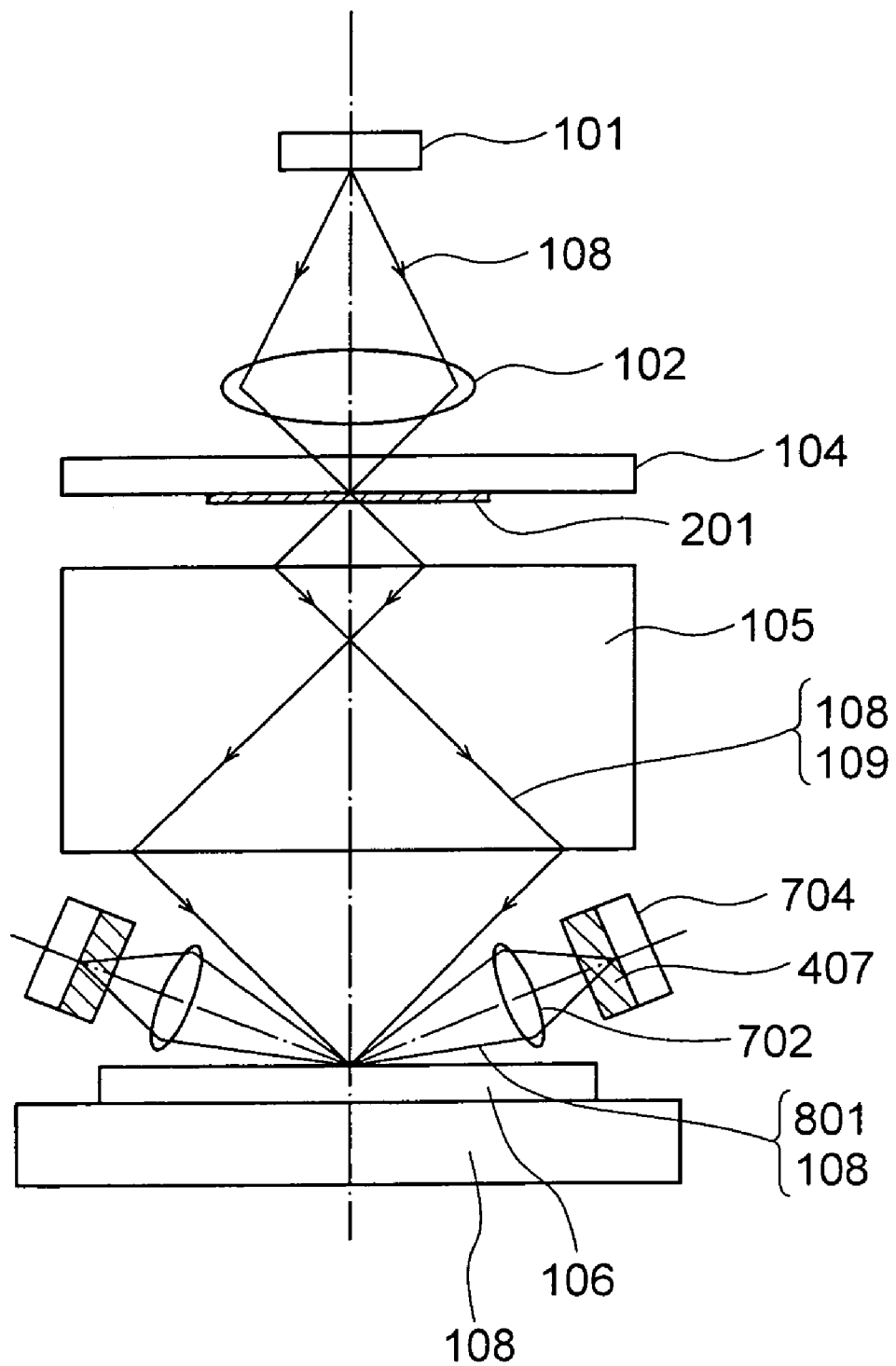
FIG. 14 is a diagram showing an example of a structure of a scanning dark-field reflection microscope according to an eighth embodiment of the present invention.

Next, an eighth embodiment of the present invention will be described below. Same reference numerals are assigned to components which are same as in the embodiments described above, and the repeated description is omitted. A structure in which, the lighting system according to the present invention is used as a light source for a scanning dark-field reflection microscope is shown in FIG. 14. In this, the optical path from the light source 101 up to the object 106 is similar as in the first embodiment. An arrangement of forming the light emitting layer 201 on a surface on the object side (lower side in the diagram) of the substrate 104 is substantially similar to an arrangement in the third embodiment (FIG. 6). An effect of the stage 108 is similar as in the seventh embodiment. Consequently, the description of individual effects of these elements is omitted.

The object illuminating light 109 emitted from the light emitting layer 201 illuminates the object 106, and due to a scattering effect inside and on a surface of the object, the object 106 emits object light (scattered light) 801. In the eighth embodiment, the light emitter excitation light 108 is not shielded at an illumination stage, and consequently, for the object 106, scattered light of the light emitter excitation light 108 occurs simultaneously together with the object light (scattered light) 801. By collecting the object light by an object light collective lens 702, and shielding a component of the light emitter excitation light 108 in the scattered light by the light emitter excitation light cutting filter 407, and detecting by the optical detector 704, it is possible to detect information of dark-field reflection.

Since a negative refraction lens has a strong (high) refractive index dispersion, by selecting appropriately a wavelength $\lambda_1$ of the light emitter excitation light 108 and a wavelength $\lambda_2$ of the object illuminating light 109, it is possible to impart a function of a spectral filter to the negative refraction lens. When a perfect imaging condition is satisfied for $\lambda_2$, light of wavelength $\lambda_1$, forms an image at a position different from a position of the object 106, and has a substantial aberration. Therefore, when the light emitter excitation light cutting filter 407 is assumed no to be there, by disposing a pin hole at a position of this filter or by making a light detection area of the optical detector 704 sufficiently small, it is possible to detect efficiently a component of $\lambda_2$, in other words, only the object light (scattered light) 801.

Ninth Embodiment

Figure 15:
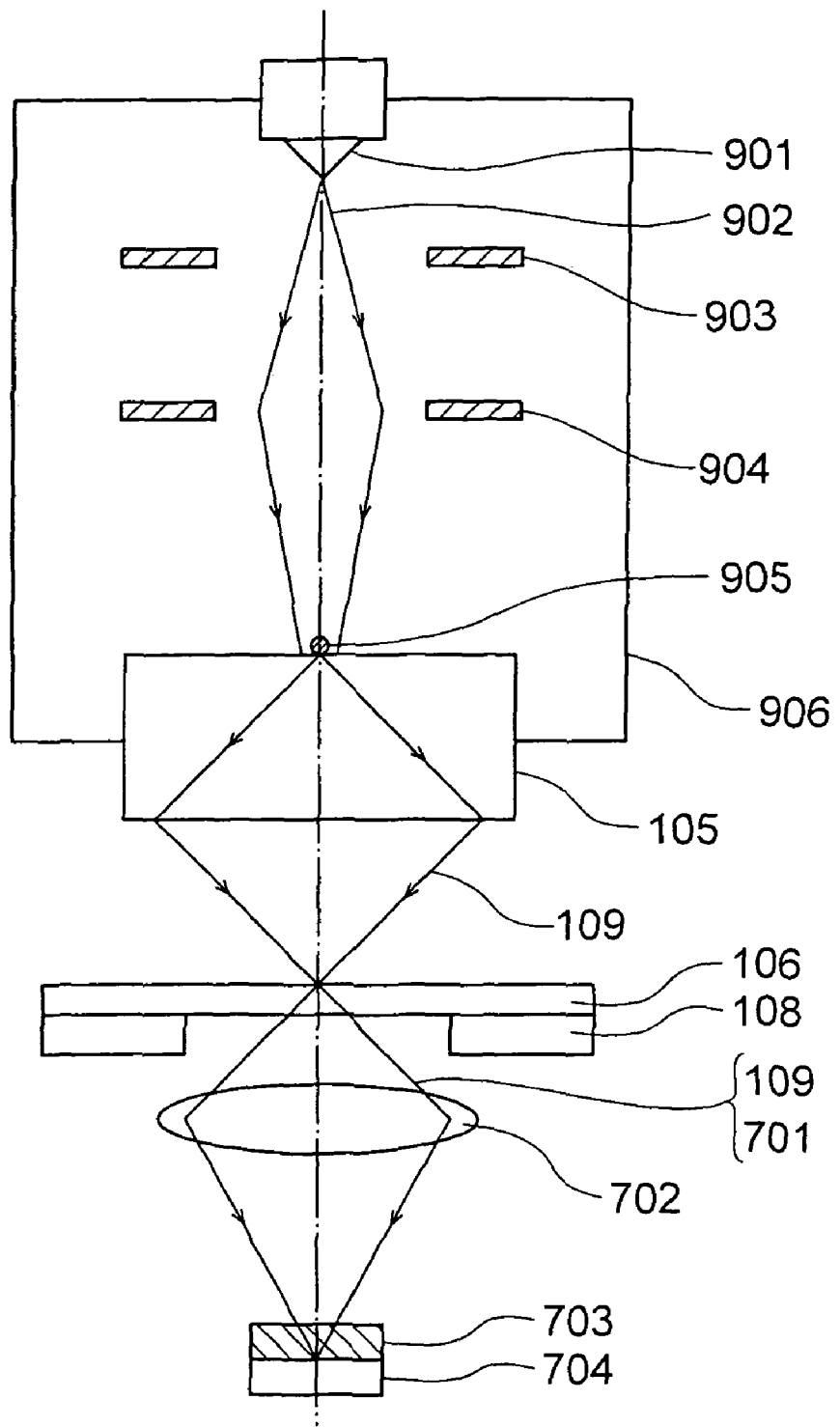
FIG. 15 is a diagram showing an example of a structure of a scanning fluorescence microscope according to a ninth embodiment of the present invention.
Figure 16:
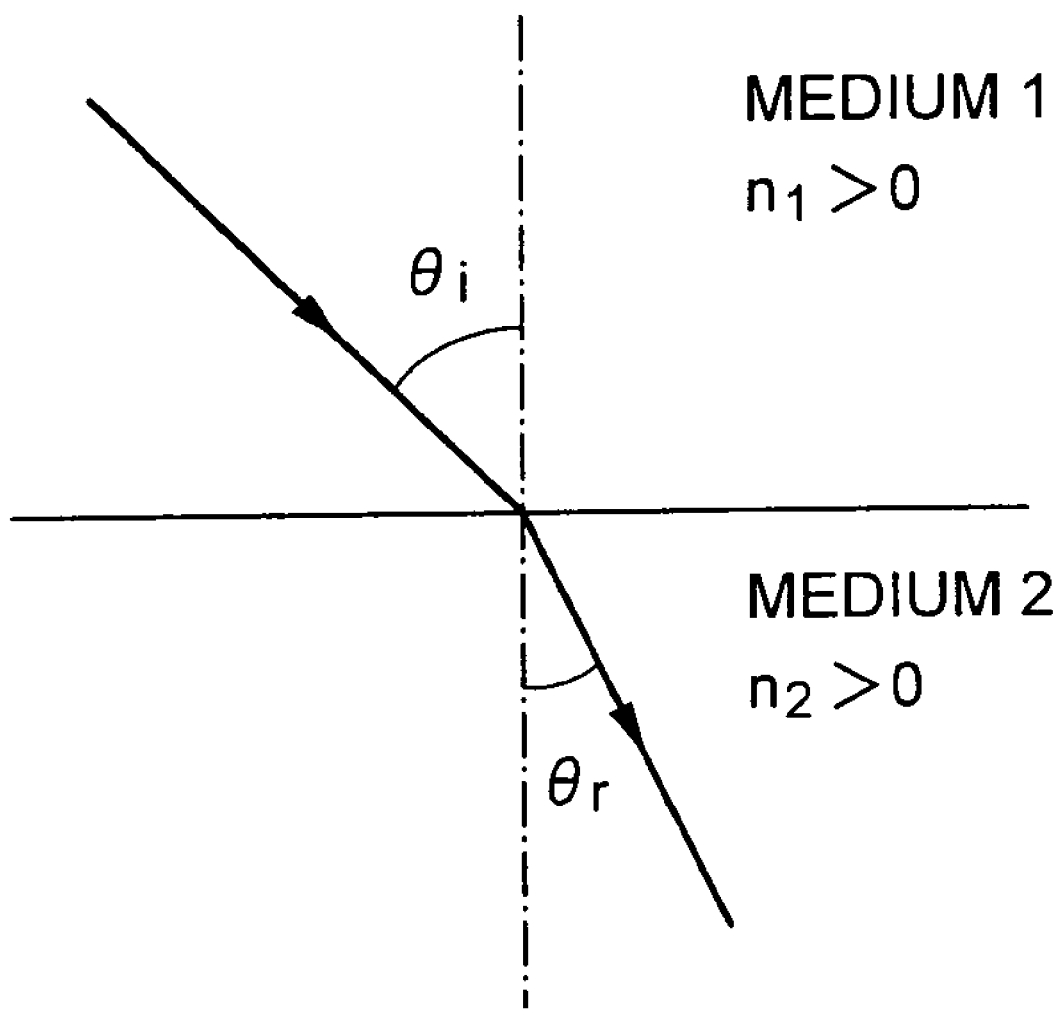
FIG. 16 is a diagram showing refraction of light in a normal optical material.
Figure 17:
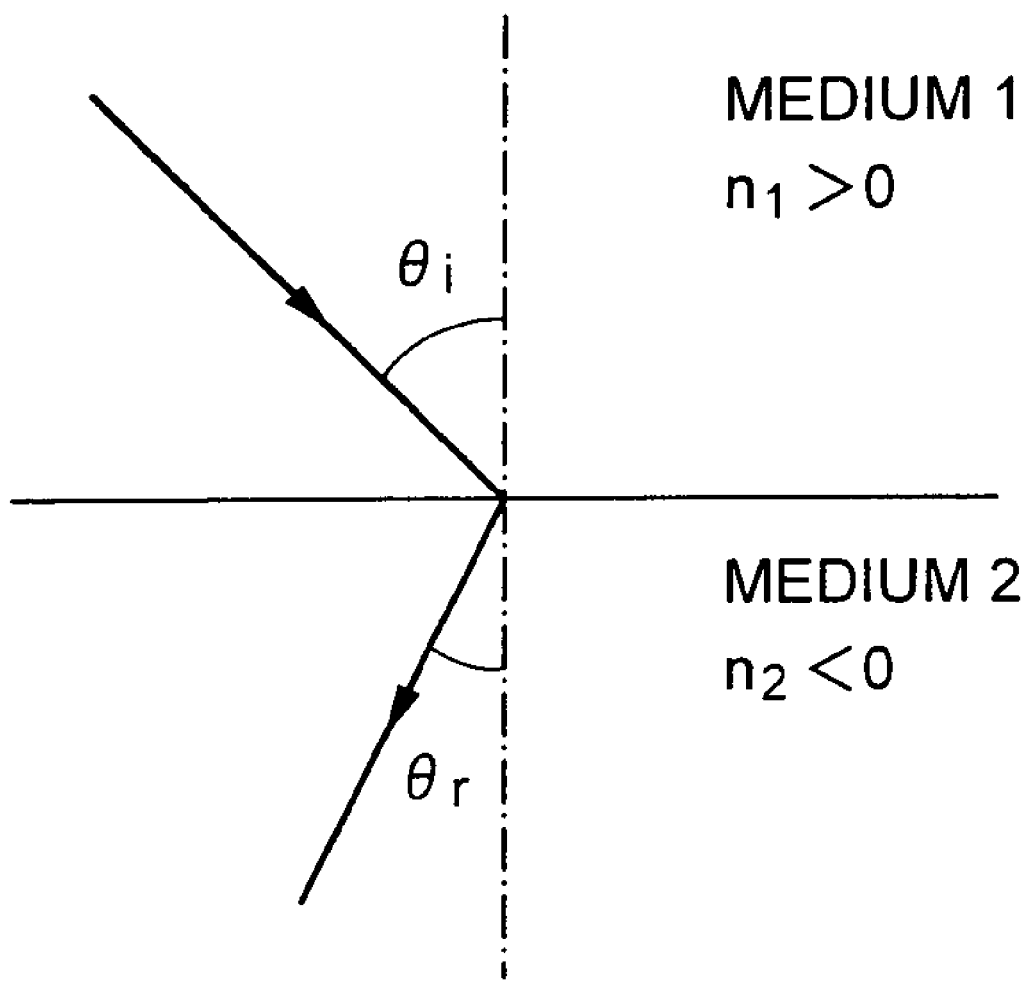
FIG. 17 is a diagram showing refraction of light in a material having a negative refractive index.
Figure 18:
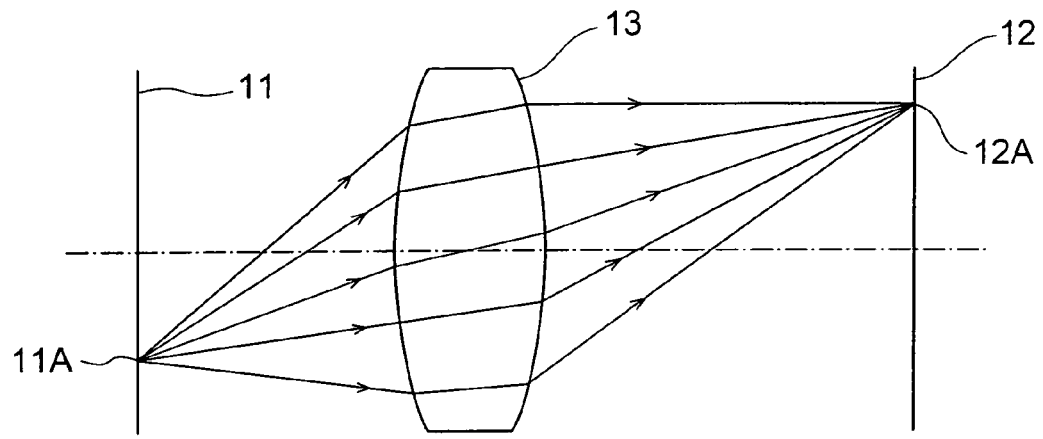
FIG. 18 is a diagram showing an imaging relationship due to a convex lens in which a normal optical material is used.
Figure 19:
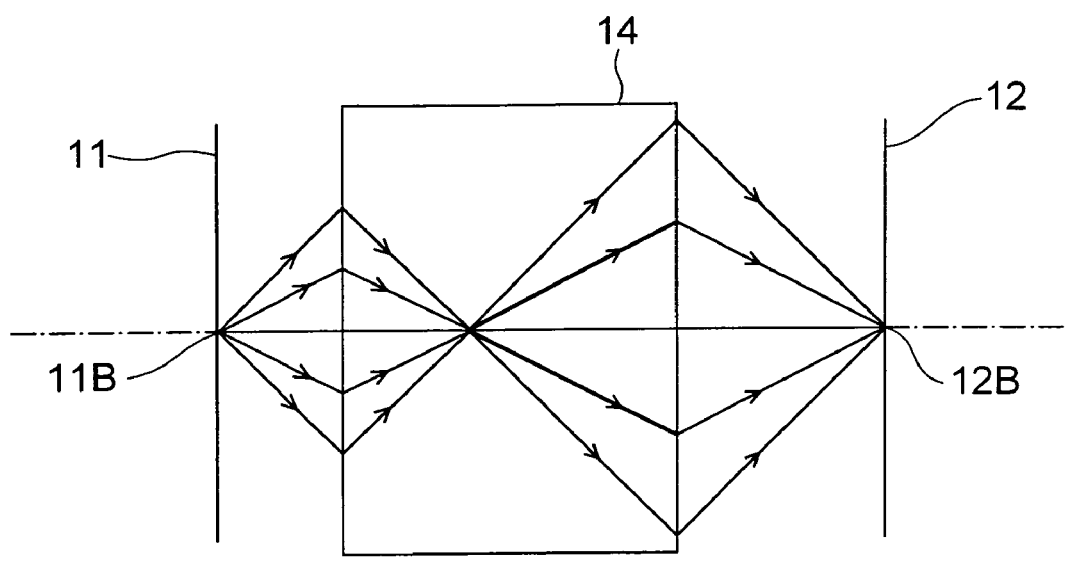
FIG. 19 is a diagram showing an imaging relationship due to a negative refraction lens.

Next, a ninth embodiment of the present invention will be described below. Same reference numerals are assigned to components which are same as in the embodiments described above, and the repeated description is omitted. A structure in which, the lighting system according to the present invention is used as a light source for a scanning fluorescence microscope is shown in FIG. 15. In this, the cathode 901, the electron beam 902, the electrode (accelerating electrode) 903, the electron lens 904, the light emitter 905, and the vacuum chamber 906 are similar as in the fifth embodiment (FIG. 10). An arrangement of forming the light emitter 905 on a surface (upper side in the diagram) of the negative refraction lens 105 on which the electron beam is irradiated is substantially similar to an arrangement in the third embodiment (FIG. 7). The object 106, the stage 108, the object light collective lens 702, the object illuminating light cutting filter 703, and the optical detector 704 are similar as in the seventh embodiment (FIG. 13). Consequently, the description of individual effects of these elements is omitted.

A peculiarity of the ninth embodiment is that, the light emitter 905 being excited by the electron beam 902, the light emitter excitation light cutting filter is unnecessary, and the light emitter 905 being held directly on the negative refraction lens 105, the absorption, scattering, and reflection etc. due to the substrate do not occur.

In the embodiments from the seventh embodiment to the ninth embodiment, a method of forming a scanning microscope by a lighting system in which, a light excitation light emitting layer of the second embodiment or an electron beam excitation light emitter of the fifth embodiment is used has been described. However, it is possible to structure the scanning microscope exactly similarly even by a lighting system in which the quantum dot laser of the sixth embodiment is used.

INDUSTRIAL APPLICABILITY

As it has been described above, according to the present invention, it is possible to realize a high spatial resolution appropriate for a high-frequency component by the evanescent waves in a negative refraction lens, and it is useful as a light source of a lighting system, a method of lighting, and a scanning optical microscope.

The invention claimed is:

1. A light emitting type lighting system comprising:
a light emitter which includes a luminescent material which emits light when an energy is applied thereon; and
an optical system which includes an optical element which is formed of a material exhibiting negative refraction, and which is for projecting a propagating-light component and an evanescent-light component in the light emitted from the light emitter, on an object,
wherein a size of the light emitter is smaller than a wavelength of the light.

2. The light emitting type lighting system according to claim 1, wherein the light emitter is dispersed in a light emitting layer in a form of a film.

3. The light emitting type lighting system according to one of claims 1 and 2, wherein the light emitter includes a light emitting material which emits light of a wavelength $\lambda_2$ which differs from a wavelength $\lambda_1$ when excitation light of a pre-determined wavelength $\lambda_1$ is irradiated.

4. The light emitting type lighting system according to claim 1, wherein the light emitter includes at least one of a fluorescent substance, a phosphorescent substance, a non-linear optical material, and an active material such as a laser medium.

5. The light emitting type lighting system according to claim 1, wherein the light emitter includes a quantum dot laser, and the energy is a carrier current.

6. A scanning optical microscope comprising:
a lighting system according to claim 1; and
an optical detector which is capable of detecting light of a wavelength same as the light irradiated on the object.

7. The light emitting type lighting system according to claim 1, further comprising:
one of a collective lens and an electron lens which converges the energy to the light emitter.

8. The light emitting type lighting system according to claim 7, wherein the light emitter includes a plurality of luminescent materials, and a distance between at least one pair of adjacent luminescent materials among the plurality of luminescent materials is smaller than a size of the energy which is converged by the one of the collective lens and the electron lens.

9. The light emitting type lighting system according to claim 1, wherein the optical element is configured to project the propagating-light component and the evanescent-light component in the light by satisfying a condition for perfect imaging.

10. The light emitting type lighting system according to claim 1, further comprising:
a shield filter which shields the light emitter excitation light disposed one of (i) at any position between a substrate and the object, and (ii) at a position of the substrate.

11. The light emitting type lighting system according to claim 1, wherein the light emitter is a substrate which holds the luminescent material, and the luminescent material is held at a rear side of the substrate with respect to an applying source configured to apply the energy.

12. The light emitting type lighting system according to claim 1, wherein the luminescent material is a luminous bead floating in a liquid included by the light emitter, and further comprising:
a trap-light source independent of an excitation-light source which excites the light emitter.

13. The light emitting type lighting system according to claim 1, further comprising:
an optical detector which detects a light emitted from the object by the propagating-light component and the evanescent-light component in the light projected to the object from the optical element,
wherein the optical detector has a cutting filter which cuts the light emitter excitation light.

14. A method of light emitting type lighting comprising:
a light emitting step of irradiating light by applying an energy to a light emitter which includes a light emitting material which emits light, and which is smaller than a wavelength of the light; and
a projection step of projecting on an object, a propagating-light component and an evanescent-light component in the light from the light emitter via an optical system which includes an optical element which is formed of a material exhibiting negative refraction.

\* \* \* \* \*